United States Patent
Murgai

(10) Patent No.: US 11,216,848 B2
(45) Date of Patent: *Jan. 4, 2022

(54) METHODS AND SYSTEMS FOR DYNAMICALLY PROVIDING CONTENT

(71) Applicant: Capital One Services, LLC, McLean, VA (US)

(72) Inventor: Nikhil Murgai, Providence, RI (US)

(73) Assignee: Capital One Services, LLC, McLean, VA (US)

(*) Notice: Subject to any disclaimer, the term of this patent is extended or adjusted under 35 U.S.C. 154(b) by 149 days.

This patent is subject to a terminal disclaimer.

(21) Appl. No.: 16/531,655

(22) Filed: Aug. 5, 2019

(65) Prior Publication Data

US 2019/0355023 A1 Nov. 21, 2019

Related U.S. Application Data

(63) Continuation of application No. 16/010,327, filed on Jun. 15, 2018, now Pat. No. 10,402,866, which is a
(Continued)

(51) Int. Cl.
*G06Q 30/00* (2012.01)
*G06Q 30/02* (2012.01)

(52) U.S. Cl.
CPC ..... *G06Q 30/0269* (2013.01); *G06Q 30/0251* (2013.01)

(58) Field of Classification Search
CPC .................................................. G06Q 30/0269
(Continued)

(56) References Cited

U.S. PATENT DOCUMENTS 5,687,322 A * 11/1997 Deaton ................ G06Q 20/387
705/14.25
6,026,370 A * 2/2000 Jermyn ................ G06Q 20/202
235/375
(Continued)

FOREIGN PATENT DOCUMENTS

| DE | 2194696 A1 * | 6/2010 | ...... H04M 1/274583 |
| JP | 2009205683 A * | 9/2009 | ......... G06Q 30/0251 |
| WO | WO-2009111589 A1 * | 9/2009 | ............. G06Q 30/02 |

OTHER PUBLICATIONS

Gan, Mingxin. Walking on a User Similarity Network towards Personalized Recommendations. Published online Dec. 9, 2014. Retrieved online Jun. 14, 2019. https://www.researchgate.net/publication/269414286_Walking_on_a_User_Similarity_Network_towards_Personalized_Recommendations (Year: 2014).*

*Primary Examiner* — James A Reagan
(74) *Attorney, Agent, or Firm* — Perkins Coie LLP

(57) ABSTRACT

Systems and methods are disclosed for dynamically providing content to a user. The disclosed embodiments include generating a recommendation matrix based on event data received from a client. In certain embodiments, the client may be configured to generate event data associated with the client or a user associated with the client. The disclosed embodiments may also include generating an offer score matrix based on the recommendation matrix and the event data. In certain aspects, the offer score matrix may include score values associated with a set of offers to be provided to the user. The disclosed embodiments may identify a first offer from the set of offers based on the score values for the offers and provide an identification of the first offer. The disclosed embodiments may also receive content associated with the first offer for display on the client.

20 Claims, 17 Drawing Sheets

Related U.S. Application Data continuation of application No. 13/705,719, filed on Dec. 5, 2012, now Pat. No. 10,083,462.

(58) Field of Classification Search
USPC .................................................. 705/14.66
See application file for complete search history.

(56) References Cited

U.S. PATENT DOCUMENTS

| | | | | |
|---|---|---|---|---|
| 6,970,101 | B1* | 11/2005 | Squire | G08G 1/14 340/309.16 |
| 8,010,404 | B1* | 8/2011 | Wu | G06Q 30/0242 705/7.29 |
| 8,655,695 | B1* | 2/2014 | Qu | G06Q 30/0251 705/7.33 |
| 9,484,046 | B2* | 11/2016 | Knudson | G06F 3/04842 |
| 10,083,462 | B2* | 9/2018 | Murgai | G06Q 30/0269 |
| 10,402,866 | B2* | 9/2019 | Murgai | G06Q 30/0269 |
| 2004/0153373 | A1* | 8/2004 | Song | G06Q 30/02 705/26.1 |
| 2008/0120155 | A1* | 5/2008 | Pliha | G06Q 40/00 705/14.17 |
| 2010/0057560 | A1* | 3/2010 | Skudlark | H04N 21/812 705/14.49 |
| 2010/0082359 | A1* | 4/2010 | Chien | G06Q 30/0255 705/14.53 |
| 2010/0293048 | A1* | 11/2010 | Singolda | G06Q 30/0244 705/14.43 |
| 2011/0213655 | A1* | 9/2011 | Henkin | G06Q 30/0251 705/14.49 |
| 2012/0066047 | A1* | 3/2012 | Muthugopalakrishnan | G06Q 20/387 705/14.26 |
| 2012/0084122 | A1* | 4/2012 | Boehle | G06Q 30/06 705/14.1 |
| 2012/0123876 | A1* | 5/2012 | Sista | G06Q 30/0256 705/14.73 |
| 2012/0166267 | A1* | 6/2012 | Beatty | G06Q 30/0247 705/14.21 |
| 2012/0173367 | A1* | 7/2012 | Soroca | G06Q 30/0267 705/26.3 |
| 2012/0209710 | A1* | 8/2012 | Ramer | G06Q 30/0273 705/14.51 |
| 2012/0290201 | A1* | 11/2012 | McReaken | G06Q 50/14 701/410 |
| 2012/0316956 | A1* | 12/2012 | Nath | G06Q 30/02 705/14.46 |
| 2013/0046626 | A1* | 2/2013 | Grigg | G06Q 30/0207 705/14.53 |
| 2013/0103300 | A1* | 4/2013 | Rakthanmanon | G01C 21/3484 701/408 |

* cited by examiner

200

METHODS AND SYSTEMS FOR DYNAMICALLY PROVIDING CONTENT

CROSS-REFERENCE TO RELATED APPLICATIONS

This application is a continuation of U.S. patent application Ser. No. 16/010,327, filed on Jun. 15, 2018 (currently pending), which is a continuation of U.S. patent application Ser. No. 13/705,719, filed Dec. 5, 2012, now U.S. Pat. No. 10,083,462, and entitled "Methods and Systems for Dynamically Providing Content." The disclosures of the above-referenced applications are expressly incorporated herein by reference in their entirety.

TECHNICAL FIELD

The present disclosure relates generally to content delivery, including systems and methods for dynamically providing content to client devices, such as a mobile device.

BACKGROUND

Businesses use marketing campaigns to communicate the value of a brand or product to the consumers. Marketing can be advertising in the form of brand awareness, sale of products or services, or deals and incentives. Advertising can take many forms including billboards, direct mail, radio cinema, television commercials, newspaper ads, magazines, telemarketing, etc. With the emergence of the World Wide Web and advances in hand-held device technology, among other things, new advertising mediums are available to businesses. For example, advertisements can now take the form of web banners, rich media ads, social network advertising, online classified advertising, e-mail marketing, and other forms of multimedia marketing advertisements.

Generally, marketing campaigns target large collective groups of consumers. Businesses use the context of the advertising medium to determine the type of advertisement to deliver to consumers to achieve a targeted advertisement experience. For example, programs shown on television may display commercials geared towards a specific gender, age group, etc. For example, Saturday morning cartoons may display commercials geared towards children, e.g., toy commercials, whereas soap operas may display commercials directed towards stay-at-home women, e.g., fashion or home goods.

Another form of advertising, known as behavioral advertising or targeted advertising, has become more popular with the increase in access to consumers public profiles. Businesses can gather consumer information such as online activities, historical webpage consumer demographics, search terms, etc. and use that data to generate advertising material tailored to the consumer's individuality. Mobile devices provide a platform for delivering targeted advertising. Businesses may collect consumer online activities through Internet-related smart phone technologies and monitor consumer geographical location through GPS technologies embedded in the consumer's mobile device.

In order to support targeted advertising and real-time advertising, businesses may need, or have access to, a significant amount of computer infrastructure, such as servers, multiple memory devices and/or systems, routers, etc. Depending on the scope of the marketing campaign, the cost of the infrastructure required to support advertising operations may outweigh the benefit of the marketing campaign. The disclosed embodiments include systems and methods for dynamically delivering content to consumers in near real-time that address these and other concerns.

SUMMARY

The disclosed embodiments include methods and systems for delivering content, such as advertisements, to consumers. Certain disclosed embodiments include methods and systems for developing a consumer profile, generating a recommendation tool for individual consumers, tracking consumer information, delivering content (e.g., advertisements) to consumers, tracking redemption information relating to the content, updating the recommendation tool, and/or avoiding fraudulent purchases. In certain aspects, disclosed embodiments may generate a recommendation matrix using customer profile and offer data and software models. The recommendation matrix may provide weight values that are used to calculate a probability or likelihood that a particular consumer may redeem one or more offers from a set of offers that may be provided to the consumer via a client device, such as a mobile device. In other embodiments, the client device may be configured to execute software that generates score values for each offer based on the recommendation matrix and feature data reflecting feature events associated with the client device and/or the consumer. In one aspect, the score values are reflected in a score matrix that is determined based on a calculation performed on the recommendation matrix and a feature vector including feature data values associated with the feature data. The score values may each reflect a likelihood that the consumer may redeem a particular offer. The client device may be configured to identify an offer with the highest score value and provide an identification of that offer to a content provider, such as an advertisement server. Based on the identified offer, the content provider may provide content associated with the identified offer to the client device for display on a display device.

In other aspects, the disclosed embodiments may update the recommendation matrix based on updated feature data provided by the client device. For instance, the client device may be configured to perform processes that generates feature event data associated with certain events relating to the client device and/or the consumer (e.g., the location of the client device, certain operations performed by the client device (e.g., a search query performed, social network site status updates, etc.)). A server may receive the updated feature event data from the client device and update the recommendation matrix for the consumer based on the received data. The server may send the updated recommendation matrix to the client device, which may generate updated score values for offers similar to that described above. Other aspects of the disclosed embodiments are described herein.

For example, in one embodiment, a device is disclosed that may include a memory storing instructions and a processor configured to execute the instructions to perform operations consistent with certain disclosed embodiments. In one aspect, the processor may perform receiving a recommendation matrix from a remote computer and generating feature data based on one or more events associated with at least one of the user and the device. The processor may also generate an offer score matrix based on the recommendation matrix and the feature data. In certain aspects, the offer score matrix may include score values for a set of offers to be provided to the user. The processor may also be configured to perform operations including identifying a first offer from among the set of offers based on the score values for the set of offers and providing an identification of the first offer. The processor may also be configured to receive content associated with the first offer for display on the device.

In another embodiment, a method for providing content is disclosed. In one aspect, the method may include receiving, by a device, a recommendation matrix from a remote computer and generating, by a processor included in the device, feature data based on one or more events associated with at least one of the device and a user associated with the device. The method may also include generating, by the processor, an offer score matrix based on the recommendation matrix and the feature data. In certain embodiments, the offer score matrix may include score values for a set of offers to be provided to the user. The method may further include identifying, by the processor, a first offer from among the set of offers based on the score values for the set of offers and providing an identification of the first offer. In addition, the method may include receiving content associated with the first offer for display on the device.

In another embodiment, a system for providing recommendation data associated with offers to be presented to a user is disclosed. In one aspect, the system may include a memory storing instructions and a processor configured to execute the instructions to perform operations consistent with the disclosed embodiments. For example, the processor may be configured to perform operations including receiving customer data. In one aspect, the customer data may include feature data provided by a remote client, and the feature data may correspond to one or more events associated with the client or a user associated with the client. The processor may further be configured to perform operations including generating a recommendation matrix based on the customer data and offer data associated with a set of offers to be provided to the user via the client. The recommendation matrix may include model coefficient values corresponding to the offers in the set of offers and to events associated with the client or the user associated with the client. The processor may also perform operations including sending the recommendation matrix to the client for use in identifying a first offers from the set of offers to display on the client.

The systems, devices, and/or methods consistent with the disclosed embodiments provide, in one aspect, mechanisms and/or operations that dynamically deliver offers (e.g., advertisements, coupons, promotions, etc.) to consumers based on event data associated with the consumers and/or clients associated with the consumers (e.g., mobile devices, etc.).

Additional aspects of the disclosed embodiments will be set forth in part in the description which follows, and in part will be obvious from the description, or may be learned by practice of the disclosed embodiments. The objects and advantages of the disclosed embodiments may be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various disclosed embodiments and, together with the description, serve to explain exemplary principles of the embodiments. In the drawings.

DETAILED DESCRIPTION

Figure 1:
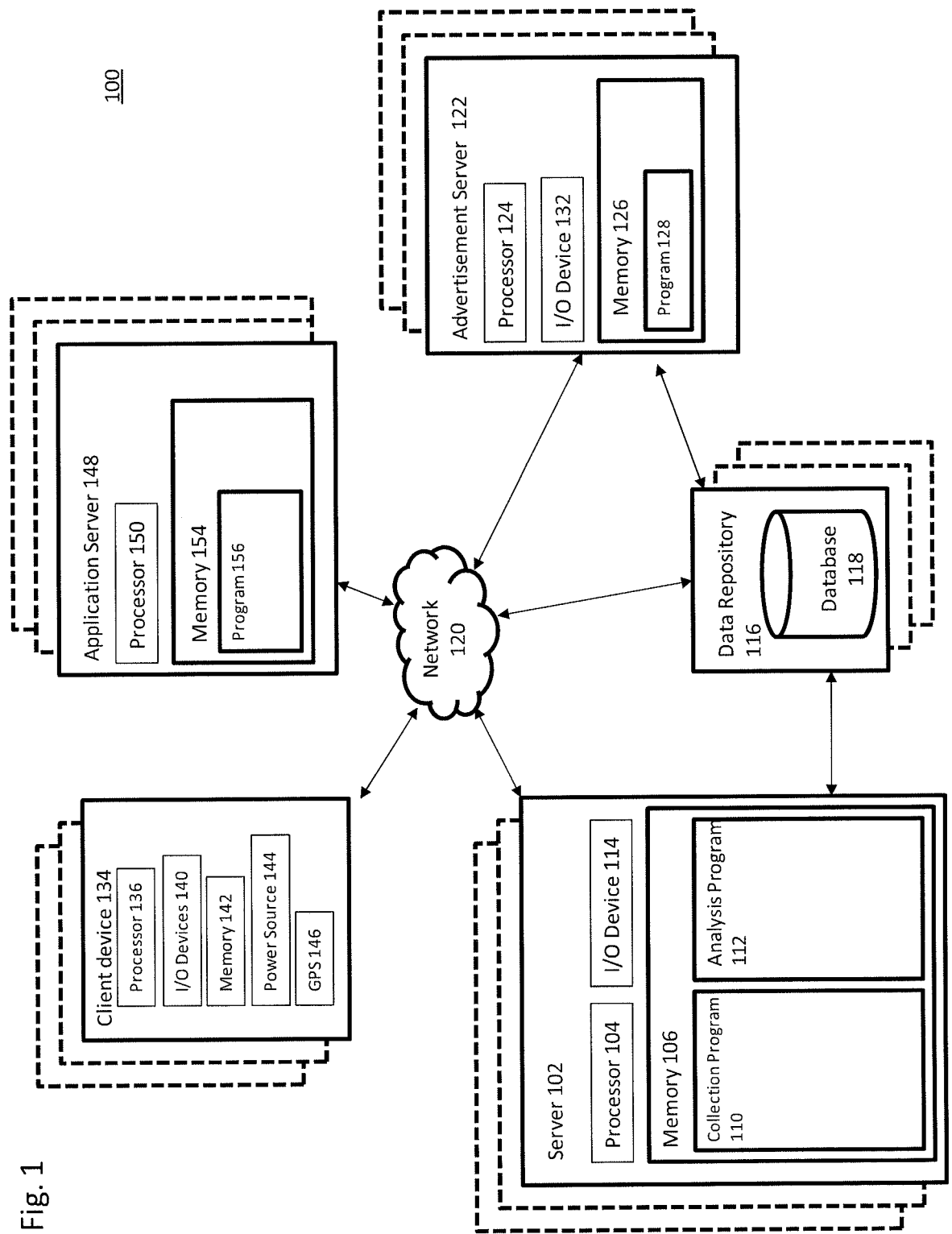
FIG. 1 is a diagram illustrating an exemplary system for delivering content consistent with disclosed embodiments.

The following detailed description refers to the accompanying drawings. Whenever possible, the same reference numbers are used in the drawing and the following description to refer to the same or similar parts. While several exemplary embodiments and features are described herein, modifications, adaptations, and other implementations are possible, without departing from the spirit and scope of the disclosed embodiments. The scope of the disclosed embodiments may be defined by the appended claims.

FIG. 1 is a diagram illustrating an exemplary system 100 including components that may individually, or in certain combinations, perform one or more of the features consistent with the disclosed embodiments. The type, number, and arrangement of the components are not limited to that shown in FIG. 1, and one skilled in the art would understand that such characteristics of system 100 may vary without departing from the scope of the disclosed embodiments.

In one aspect, system 100 may include a server 102 that is configured to execute software instructions stored in a memory to perform operations consistent with disclosed embodiments. Server 102 may be associated with a financial service provider. Server 102 may take the form of one or more general purpose computers, servers, mainframe computers, desktop computers, etc. configured to execute instructions to perform server and/or client-based operations and operations consistent with the disclosed embodiments. In some embodiments, server 102 may include a cluster of servers capable of performing distributed data analysis, for example, using Google's MapReduce™ framework. Server 102 may be a single server or one or more servers located in local or remote locations. Server 102 may be standalone, or it may be part of a subsystem, which may, in turn, be part of a larger system. Server 102 may communicate over a link with a network, such as network 120. For example, the link may include a direct communication link, a Local Area Network (LAN), a Wide Area Network (WAN), or other suitable connection.

Network 120 may be any type of network that provides communications, exchanges information, and/or facilitates the exchange of information between components of system 100, or other components not shown. In one embodiment, network 120 may be the Internet, a LAN, or other suitable connection(s) that enables system 100 to send and receive information between the components of system 100.

In one embodiment, server 102 may include one or more processors 104, one or more memory 106, and/or one or more I/O devices 114. Processor 104 may include one or more known processing devices, such as a microprocessor from the Pentium™ or Xeon™ family manufactured by Intel™, the Turion™ family manufactured by AMD™, or any of various processors manufactured by Sun Microsystems. Memory 106 may be configured to store information used by processor 104 to perform certain functions related to the disclosed embodiments. Memory 106 may be a volatile or non-volatile, magnetic, semiconductor, tape, optical, removable, nonremovable, or other type of memory or computer-readable medium and/or any other storage device known in the art.

In some embodiments, memory 106 may consist of one or more programs or subprograms that, when executed by a processor 104, perform various procedures, operations, or processes consistent with disclosed embodiments. In one embodiment, memory 106 may include a data collection program 110 which includes instructions that, when executed by a processor 104, may perform operations such as monitoring consumer spending, logging data associated with a consumer, analyzing stored data and data associated with a consumer, processing queries for stored data, and/or performing other procedures or processes associated with the disclosed embodiments.

In another embodiment, memory 106 may further or alternatively consist of a data analysis program 112 which includes instructions that, when executed by a processor, may perform operations consistent with the disclosed embodiments. For example, data analysis program 112 may be configured to analyze consumer data, develop a recommendation matrix, determine which advertisement to deliver, deliver an advertisement to a consumer or cause the advertisement to be delivered, continuously update a recommendation matrix and/or perform other procedures or processes necessary to perform disclosed embodiments.

Methods, systems, and articles of manufacture consistent with disclosed embodiments are not limited to separate programs or computers configured to perform dedicated tasks. For example, memory 106 may be configured with program 110 that performs one or more functions when executed by a processor, such as processor 104. For example, memory 106 may include a single program 110 that performs one or more functions for generating and delivering content (e.g., advertisements) to one or more consumers consistent with the aspects of the disclosed embodiments. In another aspect, program 110 could comprise multiple programs. Moreover, processor 104 may execute one or more programs located remotely from server 102 which, when executed, perform functions related to the disclosed embodiments.

Memory 106 may be also be configured with an operating system (not shown) that performs several functions well known in the art when executed by server 102. By way of example, the operating system may be Microsoft Windows™, Unix™, Linux™, Solaris™, or any other known operating system.

Server 102 may include one or more I/O devices 114 configured to receive and transmit data. I/O devices 114 may include one or more digital and/or analog communication input/output devices that allow server 102 to communicate with other machines and devices, such as an advertisement server 122 or any number of client devices 134. Server 102 may receive data from external machines and devices and output data to external machines and devices via I/O devices 114. The configuration and number of input and/or output devices incorporated in I/O devices 114 may vary as appropriate for certain embodiments.

Server 102 may also be communicatively connected to one or more data repositories 116, for example, through network 120. Data repository 116 may be a central repository for reporting and data analysis. Data repository 116 may include various types of information including historical data and may gather data from various locations, configure and translate the data into similar structures, and store data for future use.

Data repository 116 may include one or more files or databases 118 which may store information and are accessed and/or managed through server 102. By way of example, databases 118 may be Oracle™ databases, Sybase™ databases or other relational databases, or non-relational databases, such as Hadoop™ sequence files, HBase™ or Cassandra™. Databases 118 or other files may include, for example, data and information related to the consumer demographics, consumer spending, advertising information, etc. Systems and methods of disclosed embodiments, however, are not limited to a singular or separate databases.

In some embodiments, system 100 may include at least one advertisement server 122. Advertisement server 122 may be associated with a financial service provider or, in additional embodiments, may be associated with one or more vendors or merchants. Advertisement server 122 may create and distribute advertising materials to server 102 or data repositories 116 connected to server 102. In certain embodiments, advertisement server 102 may be software that is included in server 102 and executed by a processor. In other embodiments, advertisement server 122 may be separate from server 102 (as shown in FIG. 1). Advertisement server 122 is not limited to providing advertisements. In certain embodiments, advertisement server 122 is configured to execute software processes that generates or stores content associated with one or more offers that may be provided to consumers. Advertisement server 122 may be configured to receive an identification of an offer and based on that identification, send content associated with the identified offer to client 134 for display. The offer may be associated with advertisement, or may be associated with other information, such as marketing material, coupons, promotional information, etc.

Advertisement server 122 may include one or more processors 124, one or more memories 126, one or more programs 128, and/or I/O devices 132. Memory 126 may be a volatile or non-volatile, magnetic, semiconductor, tape, optical, removable, nonremovable, or other type of storage device or computer-readable medium and may contain the stored information about advertising materials. In some disclosed embodiments, memory 126 may consist of one or more programs 128 or subprograms which, when executed by advertisement server 122, may read and extract data regarding advertising information and may send the extracted data to server 102 or data repository 116 or another server that performs data collection. Alternatively, programs 128 may comprise a program that allows server, such as server 102, or devices, such as client device 134, to access data stored at the advertisement server 122.

Client device 134 may be one or more client devices communicatively connected to system 100 via network 120. In some embodiments, client device 134 may be a device including processing components that perform client device functions, such as a smart phone, a tablet, a laptop, a personal digital assistant, or another form of client device 134. In one embodiment, client device 134 may contain one or more processors 136, one or more I/O devices 140, one or more memory 142, a power source 144, and/or a global positioning system (GPS) 146. Processor 136 may include one or more processing devices, such as a Qualcomm Snapdragon™ processor, Nvidia Tegra™/Tegra 2™ processor, TI OMAP™ ¾ processor, and various other implementations of ARM Cortex A8/A9. Memory 142 may be configured to store information used by processor 136 to perform certain functions related to disclosed embodiments. Memory 142 may be volatile or non-volatile, and may be removable or incorporated within a body of client device 134. Memory 142 may be also be configured with an operating system (not shown) that performs several functions well known in the art when executed by client device 134. By way of example, the operating system may be Palm OS, webOS, BlackBerry, Windows Mobile, Symbian™, Android, and/or iPhone™ OS. In one embodiment, client device 134 may be associated with a user. In certain examples, the user may be a consumer or a potential consumer of a financial service provider that provides financial services, such as a bank, credit card company, lender, etc.

In some embodiments, client device 134 may contain one or more I/O devices 140. I/O devices 140 may allow data to be received and/or transmitted by client device 134. I/O devices 140 may also include one or more digital and/or analog communication input/output devices that allow client device 134 to communicate with other machines and devices. In further embodiments, I/O devices 140 may include one or more digital and/or analog communication input/output devices that allow client device 134 to communicate with a user. For example, I/O devices 140 may include a keyboard, mouse, monitor, printer, screen, microphone, speakers, interactive display, etc.

In some embodiments, client device 134 may be configured with an internal power source 144. Power source 144 may be a battery and may be rechargeable or replaceable. The batteries may be, for example, alkaline, lithium ion, lithium polymer, nickel metal hydride, or nickel cadmium batteries.

In some embodiments, client device 134 may be configured with a GPS 146. GPS 146 may be a data logger, a data pusher, and/or a data puller. A data logger GPS may store a position of client device 134 periodically in memory 142. A data pusher GPS may periodically send a position of client device 134 to a server, for example, server 102, via network 120. A data puller GPS may send a location of client device 134 when queried. GPS 146 may use radio signals from satellites to determine a location of client device 134. In some embodiments, client device 134 may be equipped with an assisted-GPS (aGPS). aGPS may locate client device 134 using radio signals from satellites or, further, by use of network resources to locate client device 134.

Client device 134 may connect to network 120 through the Internet or other communication protocols, e.g., Universal Serial Bus (USB), Bluetooth, hardware plug-ins, WiFi and other wireless local area network (WLAN) protocols, and 3G/4G/LTE and other wide area network (WAN) protocols.

In one embodiment, system 100 may include application server 148. Application server 148 may be associated with a financial service provider or, in additional embodiments, may be associated with one or more WAN providers and/or manufacturers of client device 134. Application server 148 may be a system or software that is included in server 102 and executed by a processor. Alternatively, application server 148 may be separate from server 102. Application server 148 may be configured to communicate with one or more client devices 134 via network 120. Application server 148 may create, store, and/or distribute applications to client device 134. In one aspect, application server 148 may include a processor 150, a memory 154, a program 156, and/or I/O devices (not shown). Memory 154 may be volatile or non-volatile, magnetic, semiconductor, tape, optical, removable, nonremovable, and/or any other type of storage device or computer-readable medium and may contain information regarding advertising materials.

Application server 148 may include a program 156, which may be one or more software programs with instructions that may be executed by a processor (e.g., processor 150) to provide application server 148 functions. In one aspect, program 156, when executed by processor 150, may perform application provisioning functionalities that provide an interface through which a user may obtain an application for client device 134. The application may be a mobile application for use on mobile devices (e.g., smart phones, tablets, etc.) and may include instructions that when executed by one or more processors 136 of client device 134 provides functionalities in accordance with disclosed embodiments. A user may interact with the application provisioning functionalities of application server 148 using an interface executed on client device 134. In one example, a user may request a mobile application provided by application server 134 using client device 134. In response, application server 148 may provide the mobile application to client device 134 over a network, such as network 120. Other known mechanisms art may be implemented to provide applications to client device 134.

Aspects of the disclosed embodiments provide mechanisms to identify and provide content (e.g., advertisements) to client device 134. In certain embodiments, the type of content (e.g., type of advertisement) that can be provided may be determined based on certain characteristics associated with client device 134. For example, aspects of the disclosed embodiments may determine an advertisement to display on client device 134 based on the current location of client device 134. In other embodiments, the advertisement to display on client device 134 may be determined based on a type of movement of client device 134 (e.g., the device is traveling (with a user) by a vehicle, via a user walking, via a train, etc.). In other embodiments, consumer profile information may be used to determine what type of content to display on client device 134. For instance, aspects of the disclosed embodiments may analyze past transaction history information of a consumer reflecting past purchases using a financial service account associated with the consumer. Certain disclosed embodiments may identify frequent locations and/or products purchased by the consumer using the financial service account and use that identified information to determine an advertisement to display on client device 134. These and other aspects of the disclosed embodiments may be performed by server 102, client device 134, and/or other components of system 100

Figure 2:
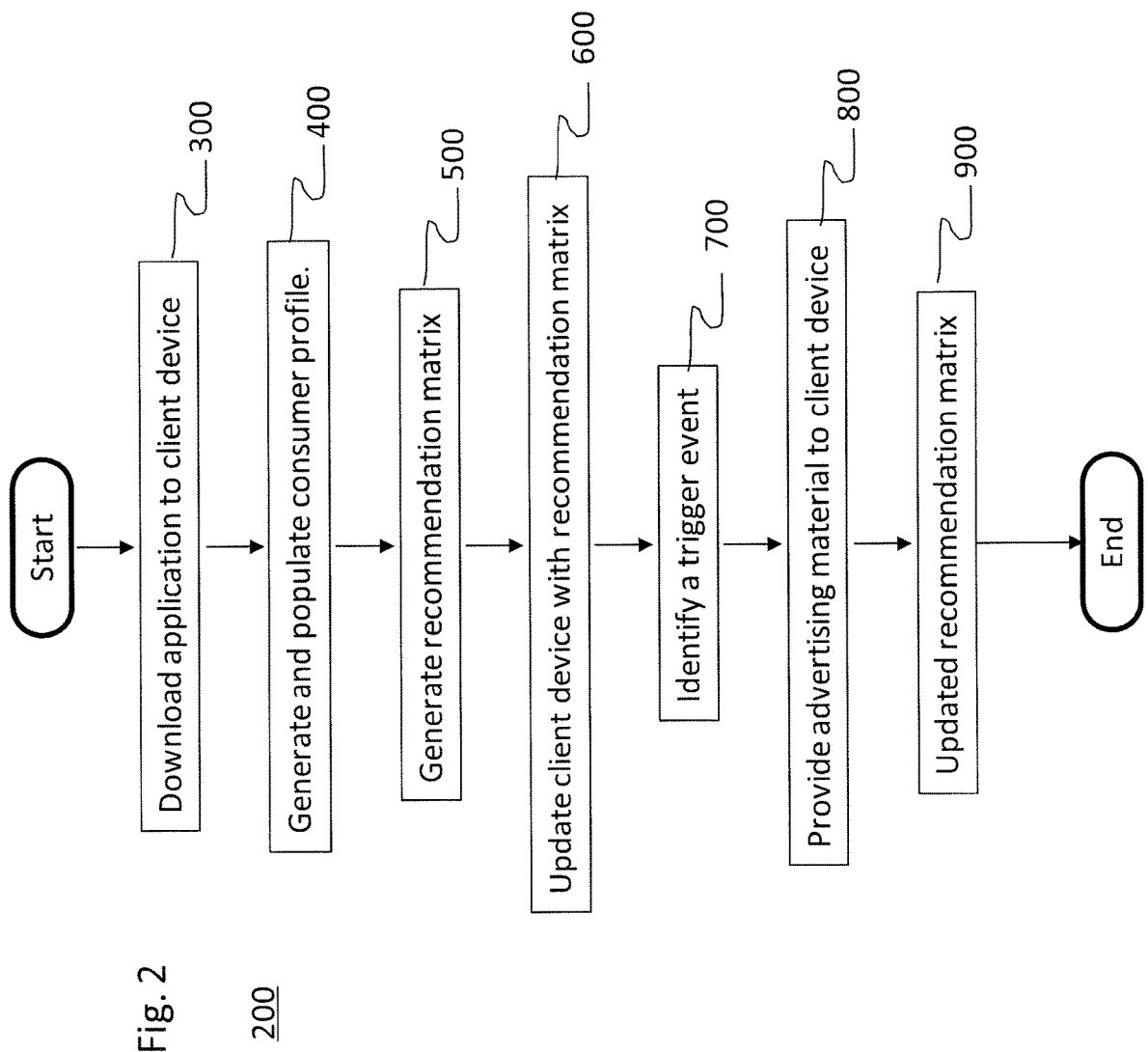
FIG. 2 is a flow diagram of an exemplary method for delivering content to consumers, consistent with disclosed embodiments.

FIG. 2 is a flow diagram 200 of an exemplary method for providing content associated with one or more offers (e.g., advertising material, etc.) to consumers, consistent with disclosed embodiments. In step 300, client device 134 may download an application that may be stored on one or more application servers 148 which may be connected to client device 134 via network 120. In step 400, server 102 may generate a consumer profile. In one aspect, a consumer profile may be a representation of characteristics relating to a consumer, such as a user associated with client device 134. The consumer profile may contain consumer data related to a consumer as discussed below in connection with FIG. 4. In step 500, server 102 may analyze the consumer profile and generate a recommendation matrix. In certain aspects, a recommendation matrix may be a data structure that provides weight values for corresponding offers and events relating to client device 134 or a consumer associated with client device 134. In one aspect, a recommendation matrix may include a data structure including one or more rows of information associated with offers that may be presented to a consumer. Thus, each row may represent a possible recommendation, such as, for example a product recommendation. In one embodiment, the constituents of each row may include one or more model coefficients that reflect weight values generated by model analysis on consumer data included in the consumer profile information and offer data.

In certain embodiments, the recommendation matrix may be processed against feature data associated with events relating to client device 134 (e.g., current location, whether a search query was performed on the device, social network post updates, etc.). In one aspect, certain disclosed embodiments may multiple the recommendation matrix against a feature vector reflecting the client device 134 (or consumer) feature data at a given point in time to generate score values for the recommendations (e.g., product offers). The result of the matrix multiplication may be a vector (e.g., a list) of numbers associated with each offer. In certain aspects, the disclosed embodiments may generate a number (e.g., score) for each product possibility. Aspects of the disclosed embodiments may execute software instructions that determines a certain number of the top scores and determine content to display relating to the recommendations based on those scores.

In step 600, client device 134 may receive the recommendation matrix. In some embodiments, client device 134 may receive the recommendation matrix from server 102. In step 700, client device 134 may identify a trigger event, which may be used to determine particular content, such as an advertisement, to present to a consumer. In certain embodiments, server 102 may be configured to identify a trigger event. In step 800, client device 134 (and/or server 102) may provide content (e.g., appropriate advertising material) for display on a display device of client device 134 based on an analysis of the trigger event and recommendation matrix. In one example, the content (e.g., advertising material) may contain an offer and/or incentive which the consumer may choose to redeem. In step 900, server 102 and/or client device 134 may update the recommendation matrix.

Figure 3:
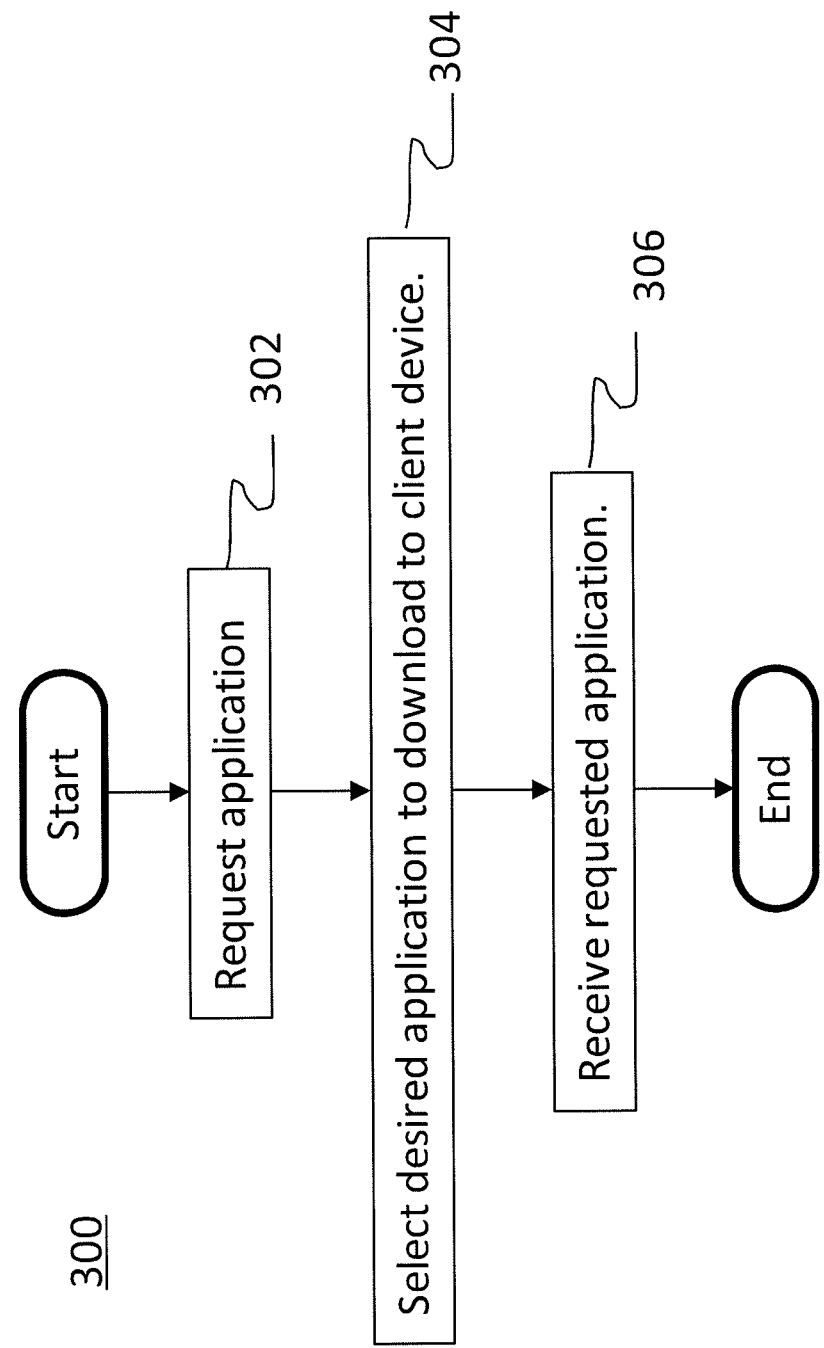
FIG. 3 is a flow diagram of an exemplary method for providing features to a client device, consistent with disclosed embodiments.

FIG. 3 is a flow diagram of an exemplary method for downloading an application to a client device 134 consistent with disclosed embodiments. In one aspect, FIG. 3 describes the process that may be performed during step 300 of FIG. 2. In step 302, client device 134 may send a request for an application to application server 148. The consumer may initiate the request using client device 134. In response, application server 134 may provide information over network 120 to client device 134 that is rendered in a display that includes a list of applications or identifies the requested application. In step 304, the consumer may select the desired application to download to client device 134. In step 306, application server 148 may receive the request and may provide client device 134 with the requested application over network 120. Client device 134 may store the application in memory, such as memory 142.

Figure 4:
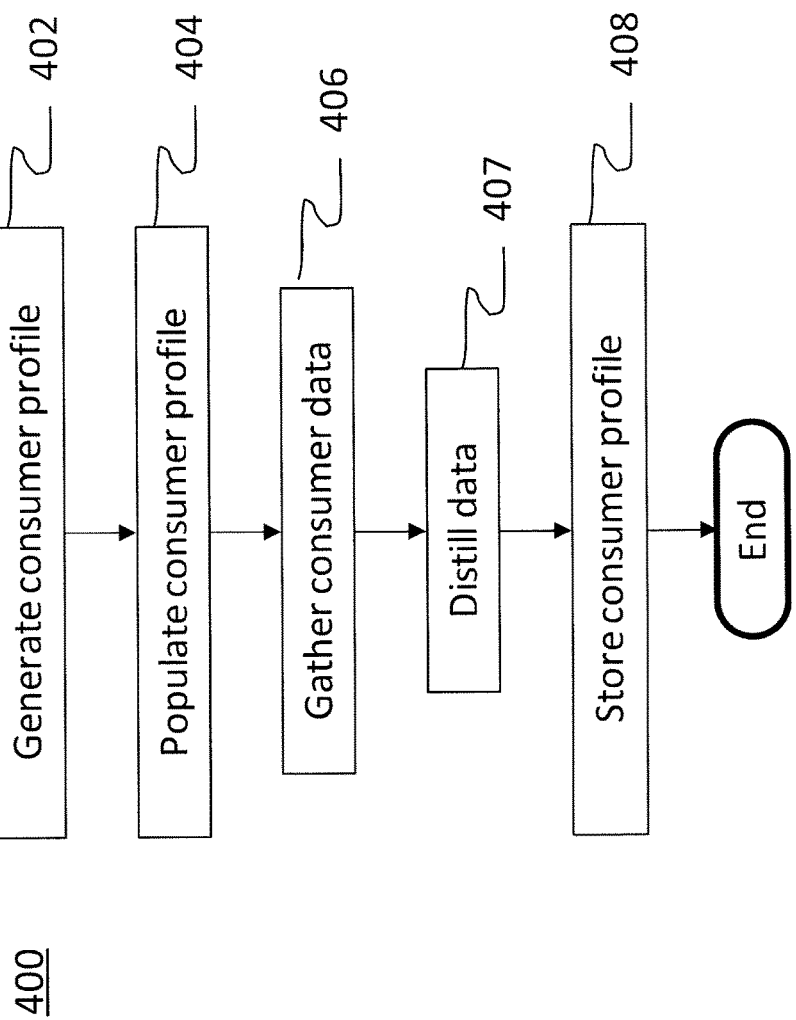
FIG. 4 is a flow diagram of an exemplary method for generating and populating a consumer profile, consistent with disclosed embodiments.

FIG. 4 is a flow diagram of an exemplary consumer profile generation process, consistent with disclosed embodiments. In one aspect, the method of FIG. 4 may include the processes performed during step 400 of FIG. 2. In step 402, server 102 may execute data collection program 110 to generate a consumer profile for the consumer associated with client device 134. In some embodiments, server 102 may generate and maintain consumer profiles for one or more consumers. In step 404, server 102 may execute data collection program 110 to populate and/or update preexisting consumer profiles. The consumer profile may include information related to the consumer, such as, for example, the consumer's age, gender, ethnicity, income, professional status, individual or household income, credit score, marital status, dependent status, residence, political affiliations, religious affiliations, and/or any other types of demographic information In exemplary embodiments, in step 406, data collection program 110 may gather consumer data to store with the consumer profile. Consumer data may include social media information, transactional and financial history information, previous trigger event information, geographical information, previous advertising redemption information, and/or other information relating to the consumer.

The social media information may consist of social media posts, photo and video posts on social media networks, comments on social media posts, blog updates, 'likes,' life events, social connections, job updates, etc. The social media information may be configured in a tree like scheme, e.g., Extensible Markup Language ("XML"), JavaScript Object Notation ("JSON"), etc. In some embodiments, the social media information may be translated into more traditional databases, e.g., Teradata, etc. In one aspect, the disclosed embodiments may take unstructured data (e.g., a post from a social media site) and converts it into structured data. For example, the disclosed embodiments may convert unstructured social media posts to a structured data format that reflects that a user is planning on going on vacation. The translated structured data may be used as features/signals as an input into the recommendation matrix.

Transactional and financial history data may include purchases, payments, and/or other debit and credit information associated with the consumer's financial history. The transactional and financial history information may be associated with a specific financial service account provided by a financial service provider (e.g., a financial service provider associated with server 102). In addition, the transactional and financial history information may include information relating to multiple accounts, such as a credit card account, a checking account, a money market account, etc., which may be provided by one or more financial service providers. In some aspects, the transactional and financial history information may include information relating to purchases and payments of goods and services, such as vehicles and real estate, groceries, clothing, home goods, etc. The transactional and financial history information may also include information relating to payments of periodic services, such as utility bills (e.g., electric, gas, water, cable, Internet access, and/or phone). The transactional and financial history information may also include financial transactional information, such as information relating to the sale and/or purchase of stocks, bonds, annuities, and/or other types of investments. In certain aspects, the transactional and financial history information may be in a RDBMS systems, such as a Teradata system. Other data formats, such as AVRO on Hadoop, can also be used by the disclosed embodiments.

Trigger event information may be one or more parameters associated with client device 134 or a consumer associated with client device 134. Trigger event information may reflect feature event data that is provided by client device 134 periodically, in response to a request, and/or in response to one or more conditions. For example, in certain aspects, client device 134 may send trigger event data to server 102 periodically or in response to a request from server 102. Further, client device 134 may execute a software process stored in memory, such as a mobile application stored in memory 142, that generates event data dynamically in response to trigger events. Client device 134 may store the event data for use in processing and determining offer scores for recommendations to display on a display device of client device 134. In certain embodiments, when a trigger event occurs, client device 134 may execute an application stored in the memory, such as memory 142, to generate, request and receive, collect, gather, or otherwise obtain content (e.g., advertising material) and display that content (e.g., advertising material) on client device 134.

In certain aspects, a trigger event may include or be related to a geographic location of client device 134, a time of day, date information (e.g., day of the week, holidays, etc.), a particular search requested via a web application on client device 124 (e.g., a web and/or map search, search terms), geographic directional movement of client device 134 (e.g., client device moves north a certain distance from a known current geographical location), social media data update, a type of short message service ("SMS") received or sent, the telephone/cell phone number associated with a voice call received by client device 134, the telephone/cell phone number sent or made by client device 134, the name of a particular contact included in an address book or contact list maintained by client device 134, an email address associated with an email received or sent by client device 134, use of other phone features and applications of client device 134, and/or any other type of trigger event. The data may be configured in any known acceptable format, such as JSON or XML.

Geographical information may include a consumer's typical geographical location based on a location of client device 134. For example, in some embodiments, client device 134 or server 102 may execute software that tracks a geographical location or movement process of client device 134. In some embodiments, client device 134 or server 102 may execute software relating to GPS 146 to determine the geographic location of client device 134. Client device 134 or server 102 may execute software that tracks the client device's 134 geographical location at predetermined time intervals, for example, every minute, half hour, hour, half-day, day, etc. Client device 134 or server 102 may execute software that may run a geographical process using the geographical location information. The geographical process may be configured to, when executed by a processor, determine a typical geographical region where the consumer travels on a regular basis, e.g., a "travel graph." The geographical process may also determine, using the graphical location information, when a consumer is in transit, in a previously visited geographical region, and/or in a new, unrecorded, geographical region. In some embodiments, client device 134 may communicate the geographical location information to server 102 and server 102 may execute software to run the geographical process. The data may be configured in any known acceptable format, such as JSON or XML.

In some embodiments, server 102 or client device 134 may be configured to recognize the geographical location of client device 134 as a trigger event for the provisioning of a particular advertisement to client device 134. For example, server 102 may receive information from client device 134 which may identify the current geographic location of client device 134. In response, server 102 may provide information that is used to determine one or more advertisements to deliver electronically for display on client device 134, via for example I/O device 140. The type of advertisement provided may be based on one or more characteristics of client device 134 or a consumer associated with client device 134. For example, aspects of the disclosed embodiments may determine an advertisement to display on client device 134 based on the current location of client device 134. Thus, for example, server 102 or client device 134 may determine and deliver for display on client device 134 a different advertisement in response to receiving information reflecting that client device 134 is in transit. Alternatively, server 102 may determine and deliver a new advertisement when server 102 determines that client device 134 has relocated to a new geographic region.

Additionally, in some embodiments, server 102 and/or client device 134 may obtain and store redemption information reflecting characteristics relating to the redemption of offers, advertisements, etc. by the consumer (via client device 134 or otherwise). The consumer's redemption data may include information reflecting redemptions by the consumer (or client device 134) on the current day, the previous day, the previous week, the previous month, the previous year, etc. Redemption data may include the consumer's reaction to advertising materials. For example, if the consumer redeemed an offer that was included in the advertisement or if the consumer habitually ignores offers in the advertisement or if the consumer has a series of reactions to advertisements. The data may be configured in any known acceptable format, such as JSON or XML.

In step 407, data analysis program 112 of server 102 may be configured to distill the data gathered. In one aspect, data distillation may involve taking historical data, including outcomes (e.g., purchases or offer redemption information) and training statistical machine learning models to predict such outcomes based on new future data. In one example, server 102 may perform a recommendation matrix process to produce a recommendation matrix. In certain embodiments, server 102 may use known algorithms in software form that are executed by a processor to produce prediction results, such as logistic regression, Naïve Bayes, Maximum Entropy, TreeNet, etc. After the data has been distilled in step 408, the data analysis program 112 may be configured to store the data in memory 106, data repository 116 and/or other storage locations. The distilled data may be associated with and/or stored concurrently with the consumer profile.

Figure 5:
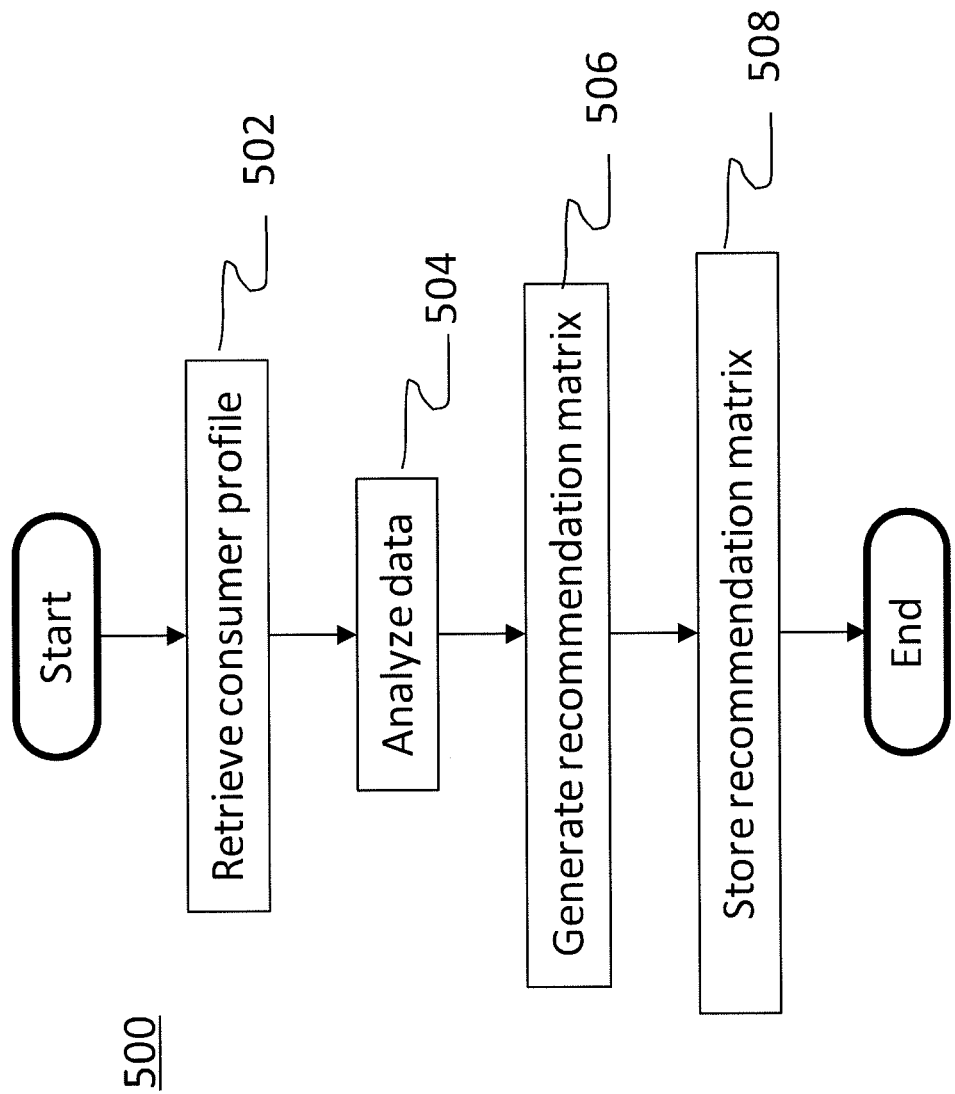
FIG. 5 is a flow diagram of an exemplary method for generating a recommendation matrix, consistent with disclosed embodiments.

FIG. 5 is a flow diagram of an exemplary method for generating a recommendation matrix consistent with disclosed embodiments, including step 500 of FIG. 2. In one embodiment, server 102 may execute data analysis program 112 to perform the process of FIG. 5. For example, in step 502, data analysis program 112 may be configured to retrieve the consumer profile containing demographic information and/or other consumer information. In step 504, data analysis program 112 may be configured to analyze the data stored with the consumer profile into a set of recommendations for the consumer. For example, processor 104 may execute data analysis program 112 to extract data from the consumer profile and run it through an analytical model, for example, an Apache™ Hadoop™ batch processing model or similar analytical model software. Data analysis program 112 may also be configured to determine content (e.g., advertising) recommendations for the consumer using other processes. For example, server 102 may store in memory 106 a predetermined list of advertisements that have been delivered to the consumer (via client device 134) over a previous period of time. Server 102 may also store history characteristics relating to the delivered advertisements that reflect which advertisements were redeemed and/or ignored by the consumer. Data analysis program 112 may determine from the history characteristics, advertisement recommendations for the consumer.

In step 506, data analysis program 112, using the analytical model, may convert the recommendations into a recommendation matrix. In one aspect, a recommendation matrix may comprise an array of numbers, symbols and/or expressions (e.g., matrix elements or entries) arranged in a series of rows and columns. Alternatively, the recommendation matrix may be configured in other formats, such as multiple level tables, multiple dimensional arrays, etc. In one example, the number of rows in the recommendation matrix be equivalent to the number of advertisements available to display to the consumer. For example, one hundred potential advertisements may exist to distribute to a consumer. In this example, data analysis program 112 may configure the recommendation matrix to include one hundred rows. In a further example, data analysis program 112 may configure the recommendation matrix with five hundred rows when five hundred potential advertisements exist to display to the consumer. An exemplary recommendation matrix consistent with disclosed embodiments is described in connection with FIG. 11 below.

In one embodiment, data analysis program 112 may configure the recommendation matrix with a number of columns based on the event information related to the consumer. For example, data analysis program 112 may determine that the consumer is associated with, for example, twenty-five different trigger events. Based on this determination, data analysis program 112 may configure the recommendation matrix with twenty-five columns. In some embodiments, the potential advertisements may correlate to columns and the trigger events may correlate to rows. The configuration and size of the recommendation matrix can vary and the above examples are not limiting to the disclosed embodiments.

In step 508, data analysis program 112 may be configured to store the recommendation matrix in a memory of server 102, such as memory 106. Server 102 may alternatively, or in addition, send the recommendation matrix to data repository 116 for storage in database 118.

Figure 6:
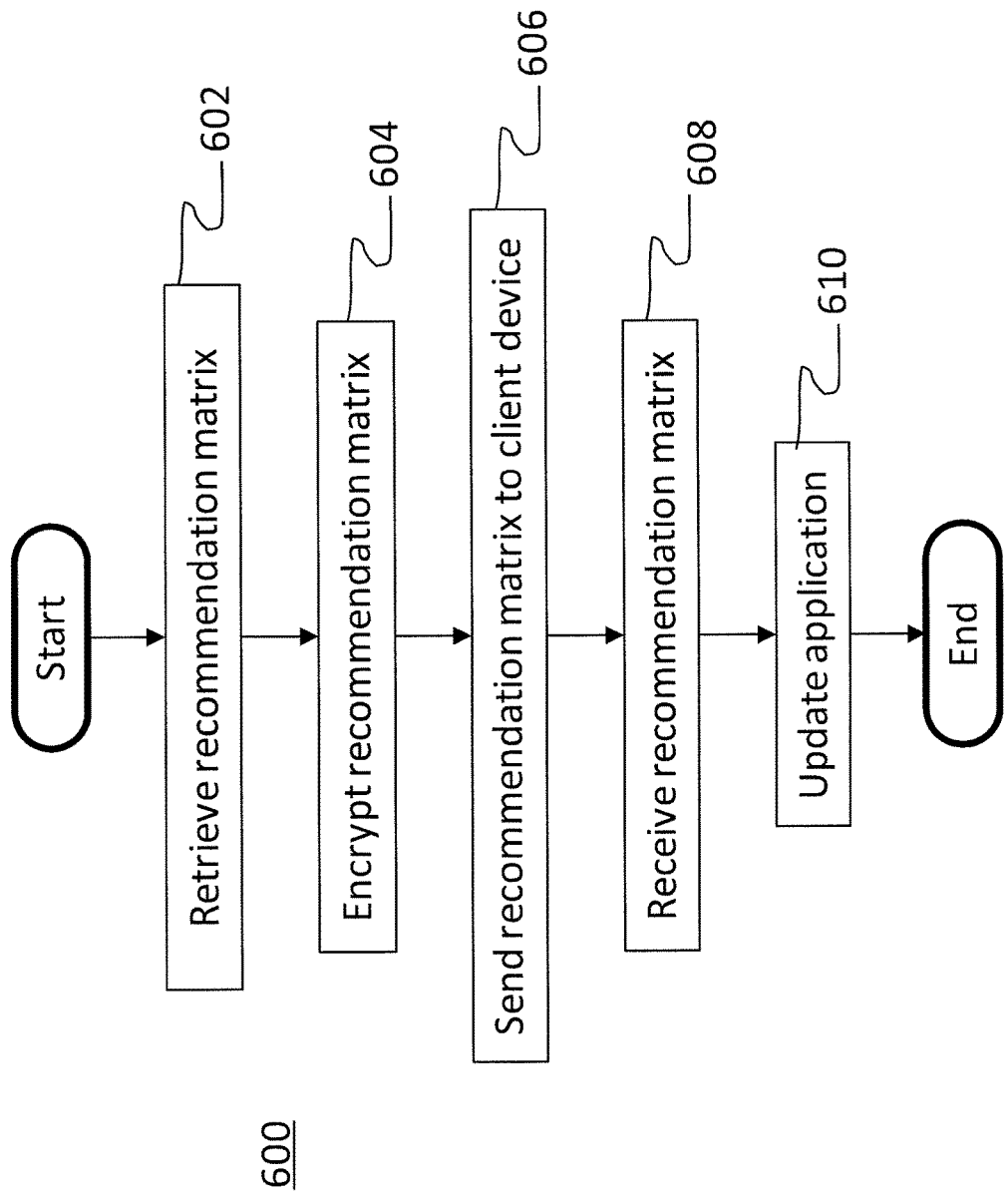
FIG. 6 is a flow diagram of an exemplary method for providing a client device with a recommendation matrix, consistent with disclosed embodiments.

FIG. 6 is a flow diagram of an exemplary method for updating client device 134 with the recommendation matrix consistent with disclosed embodiments. In one embodiment, the method of FIG. 6 corresponds to processes performed during step 600 of FIG. 2. In step 602, server 102 may be configured to retrieve the recommendation matrix from a stored location, such as memory 106 or data repository 116. In some embodiments, in step 604, server 102 may be configured to encrypt the recommendation matrix. Server 102 may use any known process for encrypting the data stored in the recommendation matrix to protect the data from inadvertent or unauthorized access.

In step 606, server 102 may be configured to communicate the recommendation matrix to client device 134 associated with the consumer via one or more I/O devices 114 of server 102. In some embodiments, server 102 may communicate with client device 134 via network 120. Server 102 may send the recommendation matrix to client device 134 at a predetermined time or upon a predetermined event. For example, server 102 may be configured to send the recommendation matrix to client device 134 during the night or during another period of time when client device 134 is not typically in use. In further embodiments, a predetermined event may be, for example, when client device 134 is set to charge. For example, in some embodiments, client device 134 may communicate with server 102 alerting server 102 that client device 134 is currently charging. Server 102 may then send the recommendation matrix to client device 134.

Alternatively, in further embodiments, server 102 may send the recommendation matrix to client device 134 when client device 134 provides information to server 102 that reflects that client device 134 it is traveling or is located in a new geographical location. For example, client device 134 may provide information indicating that client device 134 is within a certain distance of one or more certain locations (e.g., retailers, merchants, or vendors, a mall, shopping area, business district, address, etc.). In other embodiments, server 102 may send the recommendation matrix to client device 134 based on a determination that client device 134 is within a determined distance of a location where one or more goods or services that are listed in the advertisements of the recommendation matrix. For instance, server 102 may be configured to receive GPS location information from client device 134 (directly or indirectly through other components of system 100) that determines the current location of client device 134. Server 102 may execute software instructions that compare the location of client device's 134 with a list of retailers, merchants, or vendors within a determined distance of client device 134 that offer for sale goods or services that are included in the advertisements associated with the recommendation matrix.

In step 608, client device 134 may receive the recommendation matrix provided by server 102. In some embodiments, if the recommendation matrix is encrypted, client device 134 may be configured to execute software instructions to decrypt the received recommendation matrix and store the recommendation matrix in unencrypted form. In other embodiments, client device 134 may execute software instructions that decrypt the recommendation matrix after it has been stored and when used by client device 134 in accordance with the disclosed embodiments. In step 610, client device 134 may be configured to update the application the client device 134 received from application server 148 based on the communication from server 102. Updating the application may include replacing an existing recommendation matrix stored in client device 134 with the latest version communicated by server 102. Updating the application may also include storing the received recommendation matrix for use by the client device 134 application for the first time, if no existing recommendation matrix is stored on client device 134.

Figure 7:
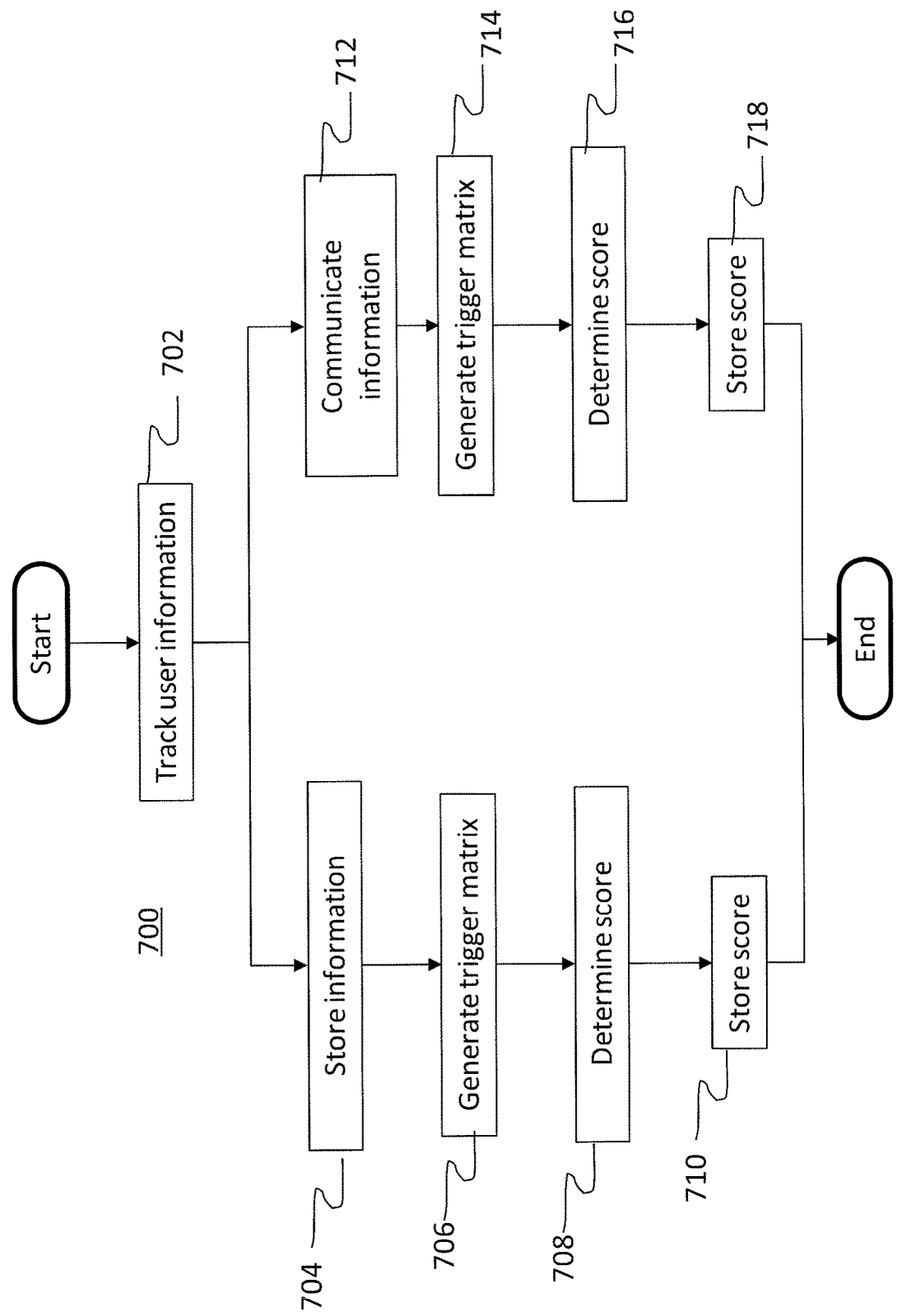
FIG. 7 is a flow diagram of an exemplary method for identifying a trigger event, consistent with disclosed embodiments.

FIG. 7 is a flow diagram of an exemplary method for identifying a trigger event consistent with disclosed embodiments. In one embodiment, the method of FIG. 7 may reflect processes performed during step 700 of FIG. 2. In step 702, client device 134 may be configured to execute instructions that monitor, collect, and store consumer information. Consumer information may include the trigger information associated with the consumer of client device 134. In some embodiments, in step 704, client device 134 may store the trigger information in memory 142. In step 706, client device 134 may execute software instructions that use the stored trigger information to generate a trigger matrix. For example, client device 134 may convert the trigger information into a vector of features. A vector of features may be a representation of features in a vector or matrix format that may be used to determine a score value for any recommendations for client device 134. Feature data and feature vector or matrix is described further below in connection with FIGS. 11-12. Client device 134 may be configured to store the trigger information in memory 142, or may be configured to communicate the trigger information to server 102 which may store the trigger information in memory 106, data repository 116, and/or other storage locations.

In one embodiment, client device 134 may execute software instructions that configure the vector of features as a matrix, which may form a feature matrix. Additionally, client device 134 may execute software instructions (via processor 136 for example) to generate a resultant using the feature matrix and the recommendation matrix received from server 102. In one aspect, the resultant may be a matrix, such as a score matrix, and may contain one or more rows and one or more columns. An exemplary score matrix is described below in connection with FIGS. 11 and 12.

In step 708, client device 134 may be configured to determine a score value for each recommendation that may be presented to client device 134 at a given time. In one aspect, client device 134 may execute software instructions that determine the score values by performing a calculation on the recommendation matrix and the feature matrix. For example, client device 134 may be configured to execute software processes that multiply the recommendation matrix with the feature matrix to generate a resultant recommendation score matrix including values for each recommendation. Additional descriptions relating to the score matrix is described below in connection with FIGS. 11 and 12.

Client device 134 may also execute software instructions that determine a maximum score among the scored values for the score matrix. A maximum score value may reflect which advertisement the consumer is statistically most likely to redeem. In one embodiment, client device 134 may be configured to determine a maximum score value by identifying the highest score value(s) for corresponding recommendations (e.g., highest score values for a certain advertisement among a set of advertisements). In one aspect, the score matrix may be configured such that a minimum score and/or other scoring system could be used to determine which advertisement the consumer may be statistically most likely to redeem and thus should be provided for display by client device 134.

In step 710, client device 134 may store the maximum score and score matrix in a memory, such as memory 142. Client device 134 may also provide the determined maximum score and/or score matrix to server 102 for storage in a memory, such as memory 106, data repository 116, and/or other storage locations. Further, client device may send the score value(s) and/or the maximum score value(s) to advertisement server 148 (or server 102) to identify the content that is to be provided to client device 134 at a given point in time. For instance, client device 134 may send an identification of a particular advertisement to advertisement server 148 (or server 102) based on the score value for that advertisement. Based on the identification information, advertisement server 148 (or server 102) may send content for the advertisement to client 134 for display.

In other embodiments, in step 712, client device 134 may be configured to provide the trigger information to server 102 via network 120. In step 714, data analysis program 112, or another program stored at server 102, may be configured to generate a feature matrix in a manner similar to that described above in connection with step 706. In step 716, data analysis program 112, or another program stored at server 102, may be configured to generate a resultant based on the feature matrix and the recommendation matrix server 102 previously sent to client device 134. In one aspect, the resultant may be a matrix, such as a scored matrix, and may contain one or more rows and one or more columns. Data analysis program 112, or another program stored at server 102, may be configured to determine score values for the rows and columns of the scored matrix and determine a maximum score value similar to that described above in connection with step 708.

In step 718, server 102 may store the score matrix and maximum score in memory 106, data repository 116 and/or other storage locations. In some embodiments, in step 718, server 102 may communicate the maximum score and score matrix back to client device 134, where client device 134 may store the score and score matrix in a memory, such as memory 142.

Figure 8:
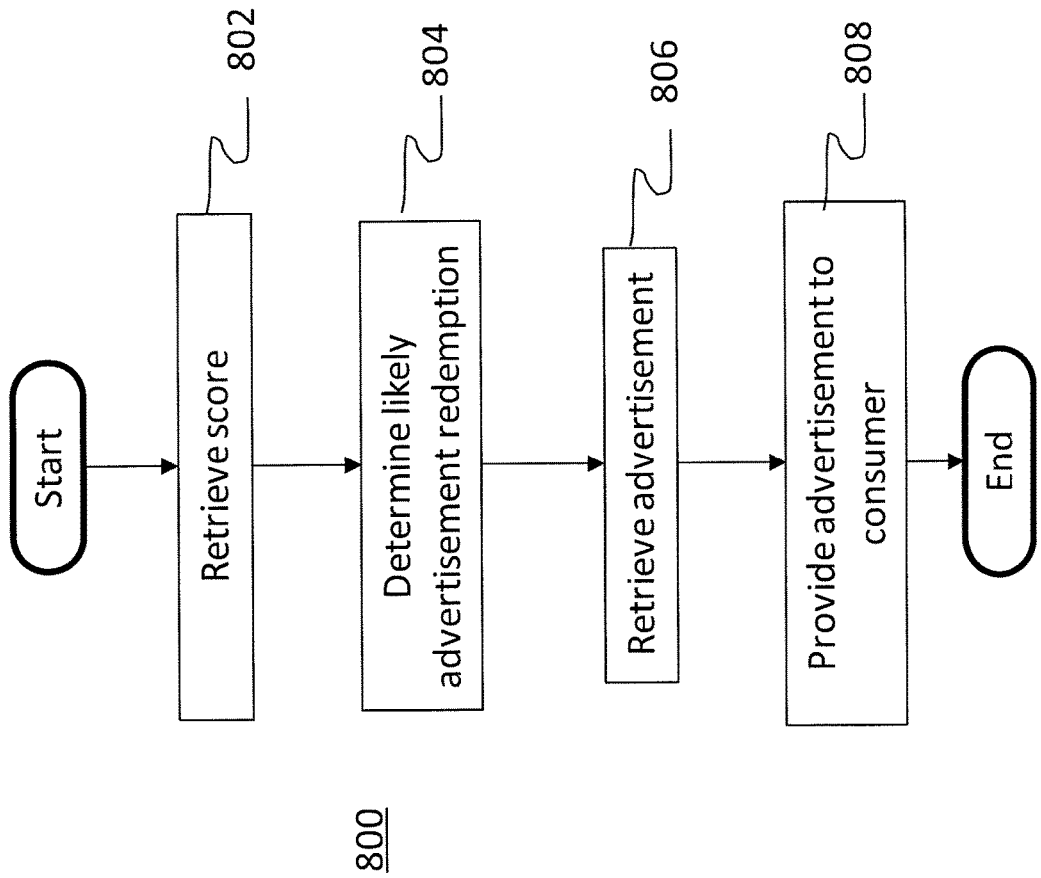
FIG. 8 is a flow diagram of an exemplary method for selecting appropriate advertising material, consistent with disclosed embodiments.

FIG. 8 is a flow diagram of an exemplary method for providing appropriate content (e.g., advertising material) to client device 134 consistent with disclosed embodiments. In one aspect, the method of FIG. 8 may reflect the processes performed in step 800 of FIG. 2. In certain aspects, the processes of FIG. 8 may be performed by advertisement server 148. In other aspects, the processes of FIG. 8 may be performed by server 102 or by software executed by client device 134.

In step 802, client device 134, advertisement server 148, or server 102 may be configured to retrieve the maximum score. Client device 134 may retrieve the maximum score from various locations depending on where the maximum score is stored. For example, client device 134 may retrieve the score from memory 142. Alternatively, client device 134 may execute software instructions that generates and sends a request to server 102 for the maximum score. Client device 134 may also be configured to request and receive the maximum score value from data repository 116. or another memory. Alternatively, advertisement server 148 may receive the maximum score from client device 134 or server 102.

In step 804, client device 134 (or advertisement server 148) may determine, based on the maximum score and/or score matrix, which advertising material the consumer is statistically most likely to redeem. For example, the maximum score calculated in step 708 may be associated with a particular advertisement. For instance, in embodiments where advertisement server 148 determines the recommended advertisement for display on client device 134, advertisement server 148 may search for advertisement content that is linked to the maximum score value provided by client device 134.

In step 806, client device 134 may be configured to retrieve the advertisement from one of several locations. For example, client device 134 may execute software instructions that may generate and send a request to server 102 for the advertisement associated with the maximum score. In other embodiments, client device 134 may retrieve the advertisement from memory 142 or data repository 116. In still further embodiments, client device 134 may execute software instructions that may generate and send a request to advertisement server 122 for the advertisement associated with the maximum score.

In some embodiments, in step 808, client device 134 (or advertisement server 148) may be configured to provide the selected advertisement to the consumer. For example, client device 134 may execute software that renders the selected advertisement on an interface that is displayed on client device 134. In embodiments where advertisement server 148 determines the recommended advertisement, advertisement server 148 may generate and send the selected advertisement to client device 134 using known content delivery mechanisms.

The advertising material may be in the form of advertisement and may contain, for example, incentives or offers for the consumer to utilize an account associated with a financial service provider. The advertisement may also contain, for example, incentives for the consumer based on whether the consumer makes a purchase at a specific merchant or vendor. Advertising material may also alert the consumer of a sales event occurring at one or more merchants or vendors. The advertisement may be delivered via an e-mail, a "push notification," an alert, and/or any other form of content delivery mechanism known to one of ordinary skill in the art. After the advertisement is provided, client device 134 may be configured with a set of instructions to store in memory 142 the date and time the advertisement was delivered and which advertisement was delivered. Client device 134 may further be configured to communicate this information to server 102, which may store the information in memory 106, data repository 116, and/or other storage locations.

As mentioned above, in certain embodiments, server 102 may be configured to perform steps 802-808. For example, in step 802, server 102 may retrieve the maximum score value from a storage location maintaining the score value(s). In step 804, server 102 may determine which advertisement to deliver to client device 134 based on the score. Server 102 may determine which advertisement to deliver based on the previous discussion of step 804. For example, In step 806, server 102 may be configured to retrieve the advertisement from a stored location. Server 102 may retrieve the score from advertisement server 122, data repository 116, memory 106 of server 102, and/or other storage locations. In step 808, server 102 may provide the advertisement to the consumer via client device 134. Server 102 may provide the advertisement to the consumer by one of a short message service (SMS) message, multimedia message (MMS), telephone call to mobile device 134, e-mail and/or other known delivery methods. In further embodiments, server 102 may communicate the advertisement to client device 134 and client device 134 may deliver the advertisement to the consumer via one of the methods discussed previously.

In even further embodiments, one or more steps 802-808 may be performed by server 102 or client device 134. In one aspect, server 102 and client device 134 may be configured to dynamically change which process steps of the disclosed embodiments are performed. For example, one or more factors may determine which component performs certain processes. In one example, server 102 and client device 134 may communicate over network 120, which may result in draining a charge of power source 144 (FIG. 1) of client device 134. Client device 134 may be configured to determine when its power level is below a predetermined level and, in response, client device 134 may send a message to server 102 instructing server 102 to perform the content determination and delivery aspects of the disclosed embodiments. In another example, server 102 may not have adequate computing capacity at a certain time. For example, server 102 may not have the capacity to perform any or all of the calculations necessary during certain steps in the processes disclosed above. For example, server 102 may be affected by processing a large number of advertisement delivery processes for a large number of consumers. Server 102 may determine its resources are unable to handle the delivery processes consistent with the disclosed embodiments for a certain consumer, and thus server 102 may send a message to client device 134 to instruct device to perform one or more of the processes disclosed above.

In certain embodiments, after delivery of an advertisement to client device 134, the consumer (e.g., user of client device 134) may redeem the advertising offer or not redeem the offer. In some embodiments, the advertising material may include a survey. For example, the advertisement may include a user selectable element that may open a web browser on mobile device 134. The user selectable element may direct the consumer to a survey on the web browser. The survey may be linked to a financial service provider or to a merchant or vendor associated with the advertisement. The survey may query the consumer on the relevancy of the advertisement. For example, the survey may include a questionnaire asking the consumer if they plan on redeeming the offer. The survey may further include questions as to the delivery method of the advertisement, the timeliness of the advertisement, if the consumer is receiving too many or too few advertisements, it may ask the consumer questions regarding the content of the advertisement, and/or other questions relating to the advertisement. In some embodiments, the user selectable element may direct the consumer to the application stored on mobile device 134 which may display the survey to the consumer. In additional embodiments, the survey may displayed to the consumer via other known methods.

Once the survey is complete, mobile device 134 may store the answers in its memory 142, or it may communicate the answers to server 102 which may associate and store the answers with the consumer profile in memory 106 or data repository 116. If the survey is delivered via a web browser, the web browser may automatically deliver the answers to server 102 or mobile device 134. The answers may then be associated and stored with the consumer profile in memory 106 of server 102, data repository 116, or memory 142 of mobile device 134. If the web browser is associated with advertisement server 122, advertisement server 122 may store the answers in memory 126 or may be configured with a set of instructions to communicate the answers to server 102 and/or mobile device 134 which may subsequently store the answers.

All of the steps occurring in FIGS. 7 and 8 may occur in real-time or near real-time. For example, a time delay between the trigger event and the delivery of an advertisement may be a mere few microseconds, milliseconds, seconds and/or minutes. In some embodiments, the consumer may view the advertisement in real-time, as a direct and instantaneous reaction to a trigger event.

Figure 9:
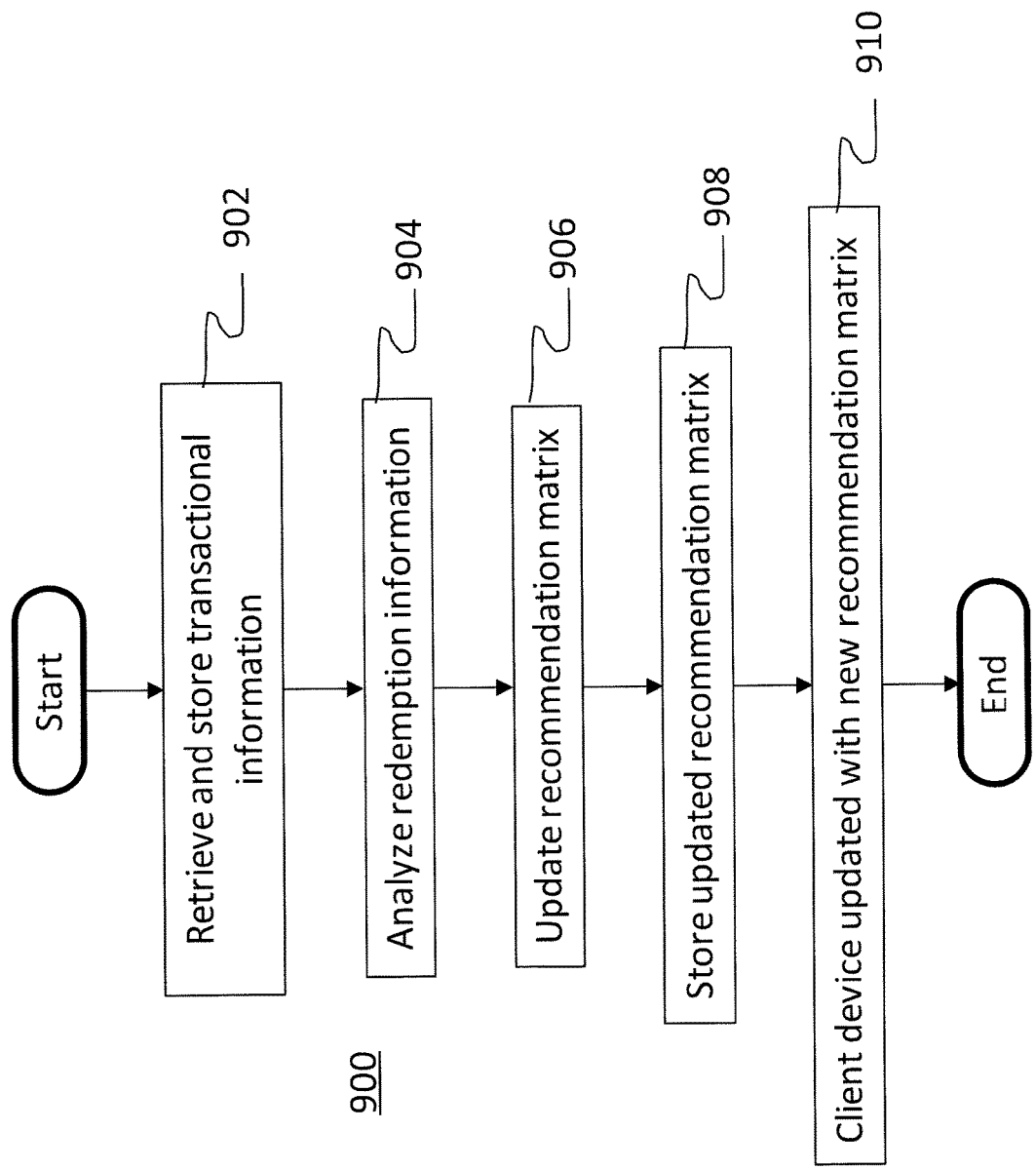
FIG. 9 is a flow diagram of updating the recommendation matrix, consistent with disclosed embodiments.

FIG. 9 is a flow diagram of an exemplary method for updating the recommendation matrix consistent with disclosed embodiments. In one aspect, the method of FIG. 9 may include the processes performed during step 900 of FIG. 2. In step 902, server 102 may be configured to retrieve and store transactional information. For example, server 102 may be configured to execute instructions (via one or more processors) to retrieve transactional information associated with one or more financial service providers. The transactional information may be from retrieved hourly, daily, bi-weekly, weekly, monthly, etc., or on demand.

In step 904, server 102 may be configured to execute instructions, for example, analysis program 112, that compares a list of advertisements delivered to the consumer to the transactional information associated with the consumer. For example, server 102 may compare a merchant or vendor where a transaction was made with a merchant or vendor associated with the advertisements displayed to the consumer. If server 102 finds a match between the transaction and advertisement merchant, server 102 may then compare the time of the transaction with the time the advertisement was delivered to the consumer. Server 102 may consider an advertisement successfully redeemed if the time between the transaction time and the between the advertisement was delivered are within a certain range. The range may be a quantifiable amount of time, for example, 10 minutes, 15 minutes, an hour, two hours, etc. Server 102 may label these advertisements as successful.

In further embodiments, in step 904, server 102 may be configured to execute instructions that determine whether one or more advertisements were not redeemed. For example, server 102 may compare the list of advertisements delivered to the consumer with the transactional information. Server 102 may determine, using the process described above, which advertisements were redeemed. Server 102 may also determine which advertisements were not redeemed. For example, server 102 may not find any transactional information matching the merchants or vendors associated with the advertisements delivered to the consumer. Server 102 may be configured to label these advertisements as unsuccessful. Further, server 102 may determine transactions were made at merchants and/or vendors associated with advertisements delivered to the consumer, but the time between the transaction and the delivery did not render the advertisement successful. Such a time delay may be a few hours, a day, or a few days. Server 102 may label these advertisements as unsuccessful.

In still further embodiments, in step 904, server 102 may be configured to execute instructions that compare successful and unsuccessful advertisements to its associated trigger event information. For example, server 102 may determine the success, or lack thereof, of an advertisement may be keyed to the trigger event that caused the advertisement to be delivered to the consumer. For example, server 102 may determine that on specific days, at specific times, when consumer is in a specific geographical region, the consumer always redeems advertisements associated with a specific merchant. For example, every Monday at 8:00 AM consumer may purchase a coffee at the same coffee shop after the consumer receives and advertisement associated with the coffee and/or coffee shop. Server 102 may be configured with a set of instructions to label and store the successful, unsuccessful, and corollary trigger event information in memory 106, data repository 116, and/or other storage locations.

In step 906, server 102 may be configured to execute instructions that update, or train, the analytical model used to create the recommendation matrix. This may be a form of supervised learning. Server 102 may use the redemption information to continuously update the analytical model used to generate the recommendation matrix such that the analytical model may become increasingly accurate with every advertisement that is or is not redeemed. In further embodiments, server 102 may also utilize updates in consumer's geographical profile, social media information, financial information, and/or demographic information. For example, server 102 may be configured with a set of instructions to recognize patterns in a consumer's profile. In one case, server 102 may notice the consumer has recently been using social media to discuss a new hobby, or may notice the consumer has begun a recent string of purchases as a specific store, such as a running store, or that consumer recently purchased a new house or automobile. Server 102 may use this information to further update the analytical model to generate an updated and possibly more accurate recommendation matrix.

In step 908 server 102 may be configured to store the updated recommendation matrix. As mentioned previously, the updated recommendation matrix may be stored in memory 106, data repository 116, and/or other storage locations. In some embodiments, in step 910, server 102 may immediately send the updated recommendation matrix to client device 134 for storage. In other embodiments, server 102 may wait to deliver the updated recommendation matrix to client device 134 as mentioned in steps 602-610 (FIG. 6).

Figure 10:
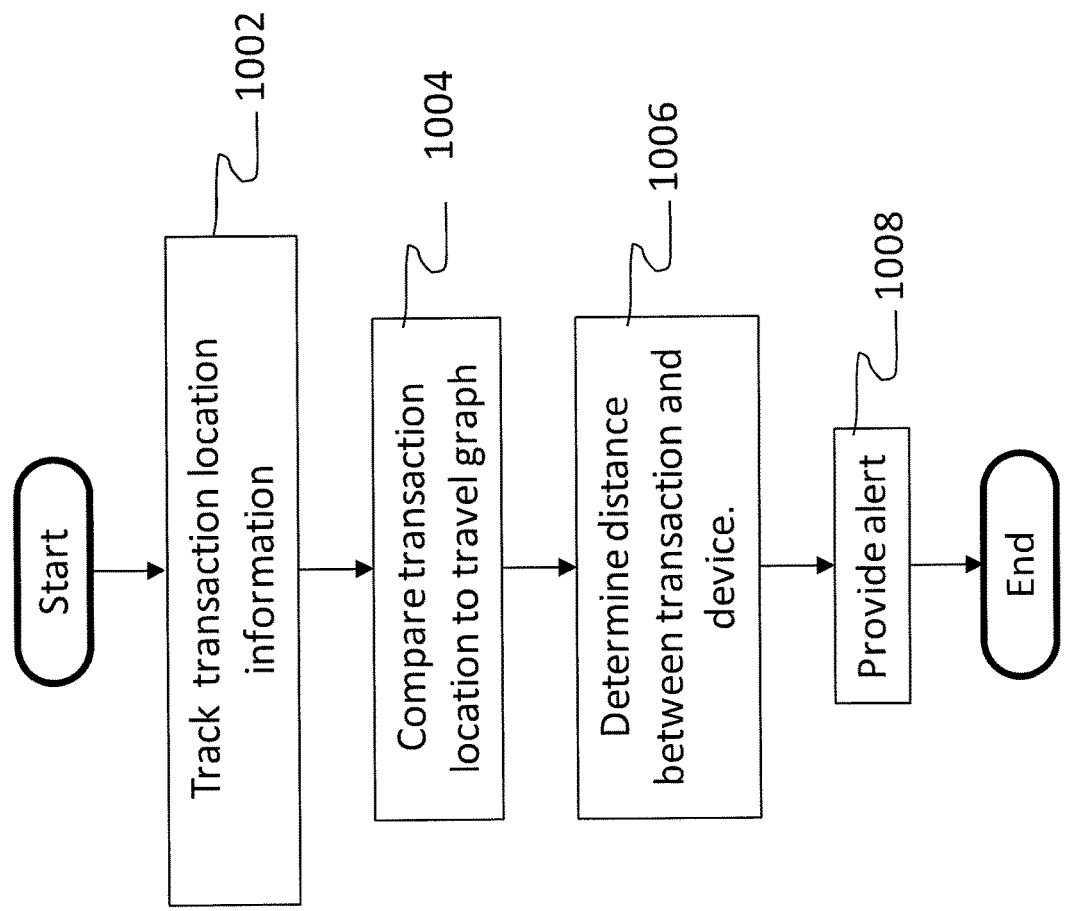
FIG. 10 is a flow diagram of an exemplary method for avoiding fraudulent purchases, consistent with disclosed embodiments.

In further embodiments, as displayed in FIG. 10, system 100 may be further configured with a method to avoid fraudulent purchases associated with a consumer account with a financial service provider, consistent with disclosed embodiments. In step 1002, server 102 may be configured to track the location of purchases made on a consumers account. The account may be associated with a financial server provider which may be linked to server 102. For example, when a credit card purchase is made on consumer's account, server 102 may receive that information.

In step 1002, server 102 may then compare the location of the transaction with a travel graph of the consumer, for example, the travel graph created in association with Step 406. Server 102 may determine the transaction was within the travel graph, or conversely, may determine the transaction occurred outside the travel graph. If the transaction occurred outside the travel graph, in step 1006, server 106 may be configured with a set of instructions to request the location of client device 134. If client device 134 is within a certain geographical range of the transaction location, server 102 may conclude the transaction was associated with the consumer. However, if the client device 134 and the transaction location are a certain distance apart, server 102 may be configured with instructions to send an alert to the consumer.

Examples of travel graphs consistent with certain disclosed embodiments are described below in connection with FIGS. 13-17.

For example, in step 1008, server 102 may communicate with client device 134 to alert the consumer that a transaction was made (or is attempting to be made). For example, server 102 may send client device an SMS, MMS, email, telephone call, or other communication method either alerting the consumer to the transaction or requesting the consumer to authorize the transaction. The consumer may use one of I/O devices 140 to respond to the communication. For example, consumer may use voice commands, user selectable elements, and/or other methods of interfacing with client device to authorize or reject the transaction. In further embodiments, server 102 may communicate with client device 134 and client device 134 may display the warning message using a push notification, alert, and/or other methods known to display a message to the consumer.

Aspects of the disclosed embodiments provide mechanisms and processes that enable certain advertisements, for example, to be delivered to user via client device 134. For example, a user may have a client device 134 (e.g., a smart phone) while moving between geographical locations. In one example, a user may be traveling within a determined distance of a coffee shop. In certain aspects, client device 134 may be configured to store a recommendation matrix and a trigger matrix that may have been generated by client device 134 or server 102, or both. In this example, client device 134 may identify a trigger event based on the user's current geographical location (using for example GPS processes) to generate a score matrix. In one aspect, the score matrix may be determined by performing multiplying the recommendation matrix with the trigger matrix. Based on the score matrix, client device 134 may determine a best score of an advertisement to display to the user via a display device on client device 134.

In other aspects, client device 134 and/or server 102 may execute instructions (via one or more processors) that determines a type of movement of client device 134 (and/or a user associated with client device 134). Client device 134 and/or server 102 may determine an advertisement to provide for display by client device 134 based on the determined movement type. For example, client device 134 may include software that periodically tracks the location of client device 134 relative to previously determined geographic locations. Client device 134 may also track temporal data relating to the determined geographical locations. For example, client device 134 may determine that the device has moved from a first location to a second location a determined distance away from the first location in a certain period of time. In certain aspects, client device may execute instructions that determine, based on this information, that client device 134 is traveling by a user walking, by a vehicle (e.g., a car, bus, taxi, etc.) or other means of travel. For instance, client device 134 may execute software that determines that client device 134 is traveling via a user moving by a vehicle based on a determination that the device has moved five miles in six minutes. Alternatively, client device 134 may determine that client device 134 is traveling via a user who is walking based on a determination that the device has moved a quarter mile in several minutes. Based on the type of travel, client device 134 (or server 102) may determine the type of content to provide for display by client device 134. For instance, client device 134 (or server 102) may determine to provide advertisement(s) relating to fuel stations (e.g., gas stations) based on a determination that client device 134 is traveling by vehicle. In other aspects, the type of advertisement may also be determined based on the score matrix disclosed above.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. For example, certain disclosed embodiments may provide mechanisms that provide recommended advertisement content for display on user device, e.g., client device 134.

Figure 11:
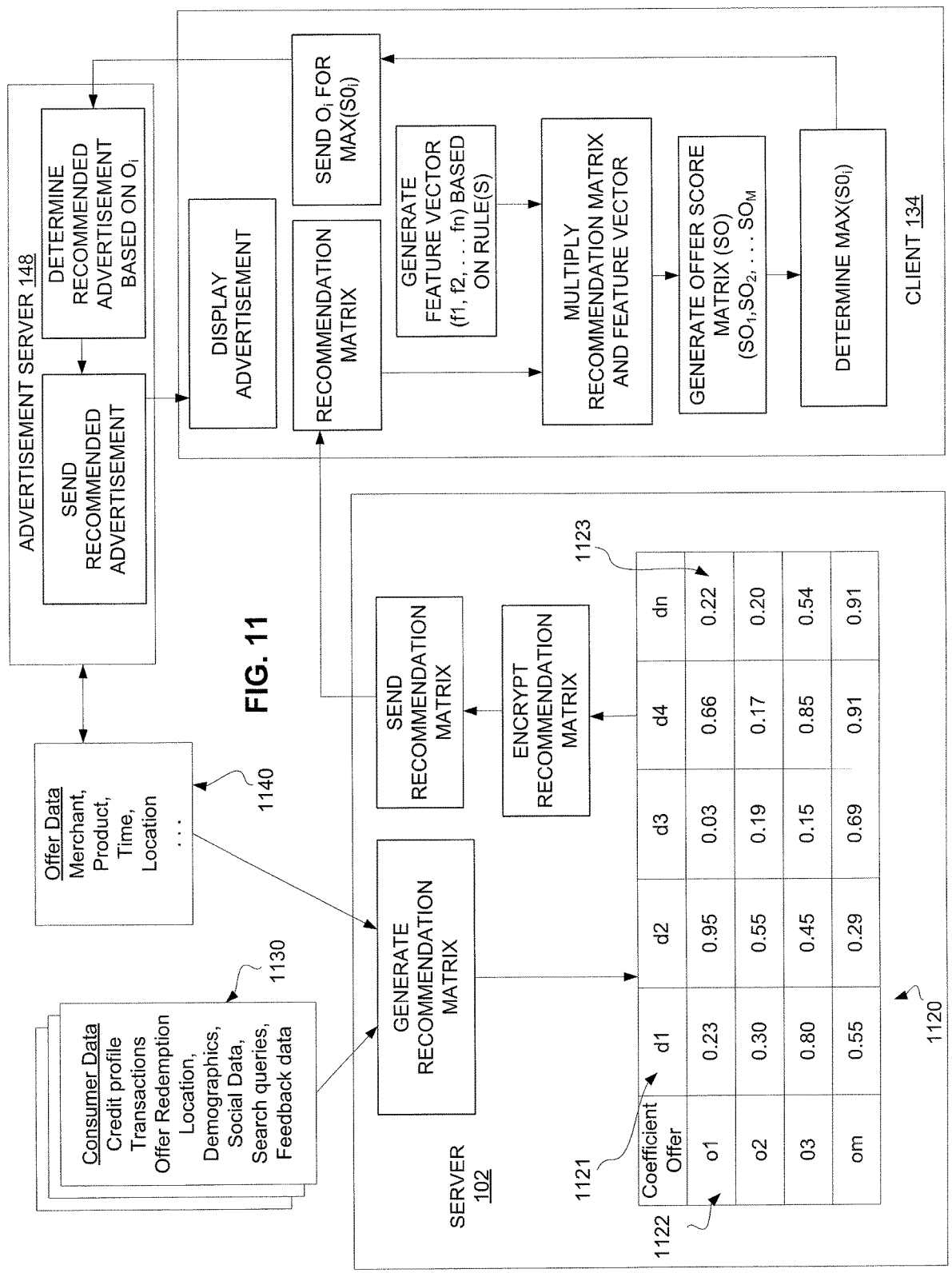
FIG. 11 is a diagram of an exemplary offer recommendation process consistent with disclosed embodiments.

FIG. 11 shows a block diagram of an exemplary process consistent with certain aspects of the disclosed embodiments to provide recommended advertisement content on a client device 134 (e.g., a mobile device). In one aspect, server 102 may receive consumer data 1130 and offer data 1140 to generate a recommendation matrix 1120 for each consumer or potential consumer. Consumer data 134 may include consumer profile information (e.g., credit profile, user demographics, etc.) and historical information relating to events (e.g., $f_{old}$) relating to a given consumer or client device 134. Historical events $f_{old}$ (e.g., which can be in the form of historical feature vectors) may include event data previously provided by client device 134, such as previous GPS location information, previous social network entries, previous search queries performed on client device 134, feedback data from a user associated with client device 134, etc.) Each of these events (e.g., $f_{old1}$, $f_{old2}$, $f_{old3}$, . . . , $f_{oldm}$) may be stored by client device 134, server 102, or another component that is available and accessible by server 102.

Recommendation matrix 1120 is exemplary and may include columns corresponding to event data 1121 (d1, d2, . . . dn), where n may be one or more data capture event types for a given consumer, or for the device associated with the consumer, at a given time. For example, d1 may reflect latitude information associated with a GPS location of client device 134, d2 may reflect longitude information associated with the GPS location of client device 134, d3 may represent a determined distance from a home location, d4 (not shown) may represent a social network status change relating to a particular location (e.g., social network post suggesting the consumer is going to a particular merchant), and so on. At a given time, the number (n) and types of data capture event data (d) for a consumer may vary.

Recommendation matrix 1120 may also include (m) rows corresponding to offers (o1, o2, o3, . . . om) that may be provided to client device 134 (or a consumer associated with client device 134). The offers (o) correspond to advertisements that may be provided to client device 134 that include content displaying the offer (e.g., discount on a product, new product information, etc.).

Server 102 may generate model coefficients 1123 that represent a weight associated with a given data capture event (d) and an offer (o). In one aspect, server 123 may execute software that runs the consumer data and offer data through a model to generate the coefficient 1123 in recommendation matrix 1120. Server 102 may store the generated recommendation matrix 1120 for each consumer in a memory, such as memory 106. Server 102 may also be configured to encrypt recommendation matrix 1120 and send the encrypted matrix to client device 134.

In certain aspects, client device 134 may execute a mobile application that performs processes consistent with the disclosed embodiments. For example, client device 134 may receive and store the recommendation matrix sent by server 102 in a memory, such as memory 142. The mobile application, when executed by a processor on client device 134, may generate a feature vector (e.g., f1, f2, . . . fn) based on newly generated feature data by client 134. The feature vector may be a feature matrix. Client 134 may generate feature data based one or more events relating to client device 134 or a consumer associated with client device 134 and, for example, one or more rules. For example, client device 134 may be configured to generate new feature data ($f_{new}$) that reflects an updated status of certain feature event(s). Based on whether the feature event has triggered (in accordance with one or more rules), client device 134 may form feature vector (f) including (n) feature data values (f1, f2, f3, ... fn). As an example, client device 134 may be configured with twenty feature events to track (e.g., n=20). The number of feature events (n) may correspond to the number (n) of data events (d) used in the recommendation matrix 1120 for the given consumer associated with client device 134. For each feature event (f), client device may apply current event data to a corresponding rule (R) and based on the processing of the rule, sets a value for a corresponding feature event (f) in the feature vector. The rules may reflect information that relates to event data determined by client device 134 or may reflect a condition associated with client device 134 or the consumer. For instance, client device 134 may implement a rule (R1) that stores that latitude GPS location information at a given time for client device 134. Another rule (R2) may store the longitude GPS location information at a given time for client device 134. A third rule (R3) may reflect a certain distance that client device 134 is from a certain location (e.g., a home location). Another rule (R4) may reflect whether client device 134 is a certain distance from another location (e.g., a work location). Yet another exemplary rule (e.g., Rn) could be whether the consumer has updated a social network status or post to reflect a specific activity (e.g., the consumer is headed to a particular merchant, is going on vacation, plans on traveling out of state, etc.). Based on whether the condition is met, or whether certain data is collected for a given rule, client device 134 updates the values of the feature matrix. For example, Each rule (R1, R2, ... Rn) may correspond to a feature value in the feature vector (f1, f2, f3, ... fn). Thus, if the exemplary rule (R4) described above is met (e.g., client device 134 is determined to be a certain distance from a certain location), client device 134 may set feature value (f4) to "1". If the rule is not satisfied, the feature value (f4) may remain at "0". Further, the latitude information for rule (R1) may be included in the feature value (f1), and so on. Client device 134 may be configured to store in a memory the one or more rules and feature data values and the feature vector.

Once the feature vector is generated, client device 134 may generate a score value for each offer (o) that reflects the probability that the consumer will redeem the corresponding offer. In one aspect, client device 134 may multiply the stored recommendation matrix against the feature vector to generate a resultant offer score matrix (So). The offer score matrix may include (m) score values, reflecting a score value for each offer ($o_i$) corresponding to the offers used in the recommendation matrix. Referring to the exemplary recommendation matrix shown in FIG. 11, client device 134 may execute software to generate the offer score matrix as follows:

$$(RM(1, 1) \times f1) + (RM(1, 2) \times f2) + \ldots (RM(1, n) \times fn) = So_1$$
$$(RM(2, 1) \times f1) + (RM(2, 2) \times f2) + \ldots (RM(2, n) \times fn) = So_2$$
$$\ldots$$
$$(RM(m, 1) \times f1) + (RM(m, 2) \times f2) + \ldots (RM(m, n) \times fn) = So_m,$$

where RM(x,y) is the coefficient value in the recommendation matrix value at column x and row y and fx represents a feature vector value.

For instance, using the recommendation matrix values shown in FIG. 11, client device 134 may calculate a score value (So1) for the first offer (o1) by:

$$(0.23 \times f1) + (0.95 \times f2) + (0.03 \times f3) \ldots (0.02 \times fn) = So_1.$$

Client device 134 may execute software that determines the highest score value for the offers reflected in the offer score matrix (MAX($So_i$)), where $o_i$ reflects the highest scored offer (e.g., one of o1, o2, ... om). Client device 134 may generate and send a signal identifying the selected offer (e.g., $o_i$) to advertisement server 148.

In one embodiment, advertisement server 148 may execute software via a processor that determines a recommended advertisement to present to client device 134 based on the received information (e.g., $o_i$) from client device 134. In one aspects, advertisement server may maintain a data structure of advertisements that correspond to each offer (o1, o2, ... om) that may be provided to the consumer. In certain aspects, server 102 may be configured to send the offers and advertising content for each advertisement to advertisement server 148. In other aspects, server 102 may be configured to send information reflecting each offer (o1, o2, ... om) to advertisement server 148. Advertisement server 148 may be further configured to receive advertising content for each offer (o) from another source (a content generating entity, etc.) and stores the content in a memory for delivery to client device 134 based on the identified offer value ($o_i$) received from client device 134.

Once determined, advertisement server 148 may send the recommended advertisement to client device 134 using known content delivery mechanisms. The mobile application of client device 134 may receive the recommended advertisement and generates information that is used by client device 134 to display the advertisement on a display of client device 134.

Figure 12:
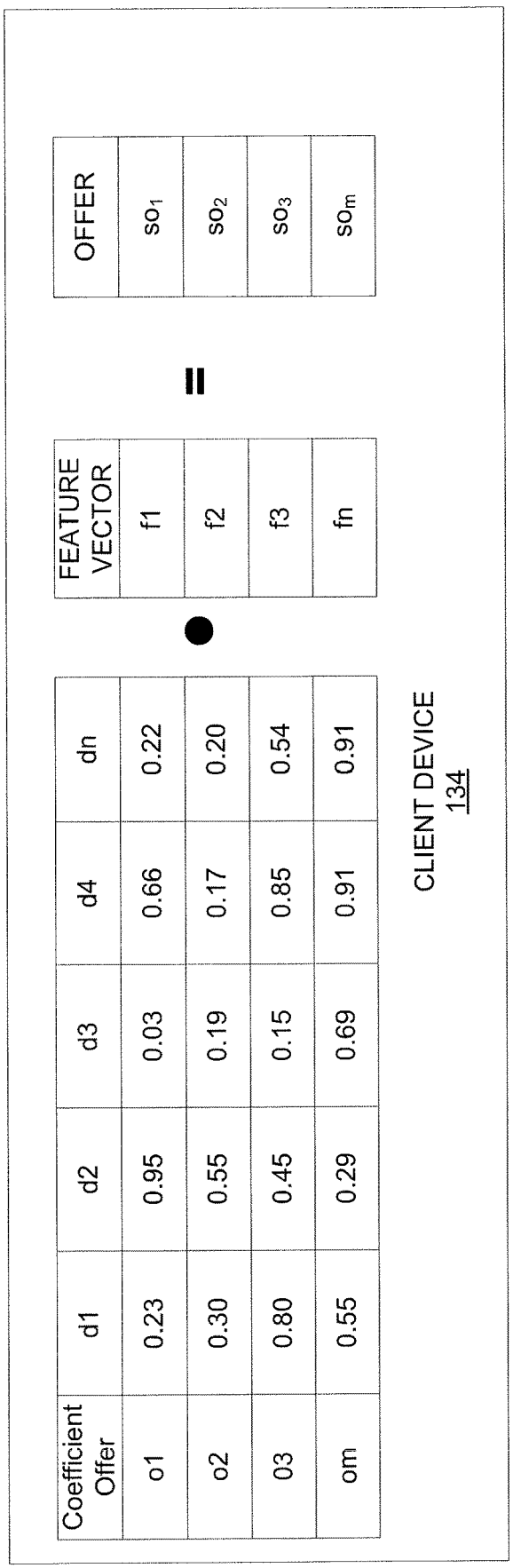
FIG. 12 is a diagram of an exemplary offer scoring determination process consistent with disclosed embodiments.

FIG. 12 shows a block diagram of an exemplary process that may be performed by client device 134 to generate the resultant offer matrix ($so_1$, $so_2$, ... $so_m$) consistent with disclosed embodiments. As shown, client device 134 may take the recommendation matrix (e.g., 1120) and perform a matrix multiplication process with the feature vector (e.g., f1, f2, ... fn) generated by client device 134 to produce the resultant offer matrix ($so_1$, $so_2$, $so_m$).

In certain embodiments, the feature events generated by client 134, and used to generate the offer score matrix (SO), may be provided to server 102 at varying times and/or based one or more conditions. In one aspect, client 134 (e.g., a mobile device) may be configured to generate and store historical feature data (e.g., historical feature event information and/or feature vectors representing that information). Thus, for example, client 134 may store whatever feature data (e.g., historical feature events and/or vectors representing those events) client 134 may be configured to gather to make decisions on what offers to recommend for display on client 134 (e.g., determining the inputs into a matrix multiplication process to generate offer scores). In certain aspects, client 134 may be configured to send generated feature data to server 102 in real time, as it is generated by client 134. In certain aspects, real time transmission of feature data by client 134 may be performed only when one or more determined conditions are met.

In other aspects, client 134 may be configured to send the historical feature data to server 102 based one or more other conditions. For example, client 134 may be configured to send the historical feature data generated by client 134 when server 102 pushes a new recommendation matrix is pushed to client 134. In certain embodiments, client 134 may send a set of feature data as a batch file or message in one transmission. In other examples, client 134 may be configured to send historical feature data to server 102 based on a location of client 134 or the user associated with client 134. For example, client 134 may send historical feature data to server 102 when client 134 determines that client 134 (or a user associated with client 134) is located in a new location, or is located within a determined distance (or outside a determined distance) of a certain location. In certain embodiments, client 134 may be configured to send the historical feature data to server 102 immediately upon determining that client 134 (or the associated user) meets certain location conditions (e.g., has moved locations, is near work, home, a certain merchant, etc.).

Server 102 may be configured to receive the historical feature data as customer data (see e.g., FIG. 11) and use that data to refine the matrix coefficients used for generating an updated recommendation matrix consistent with the disclosed embodiments. Server 102 may send the updated recommendation matrix t o client 134 for additional processing to generate updated score values for offers that may be presented to the user via client 134, consistent with the processes disclosed above.

As explained above, aspects of the disclosed embodiments may implement rules and feature events that relate to locations of client device 134. In certain aspects, the disclosed embodiments may implement travel graph processes to determine whether certain events have occurred and to determine whether rules relating to those events are satisfied in order to set a value for certain feature vector values (e.g., f1, f2, f3, . . . fm).

Figure 13:
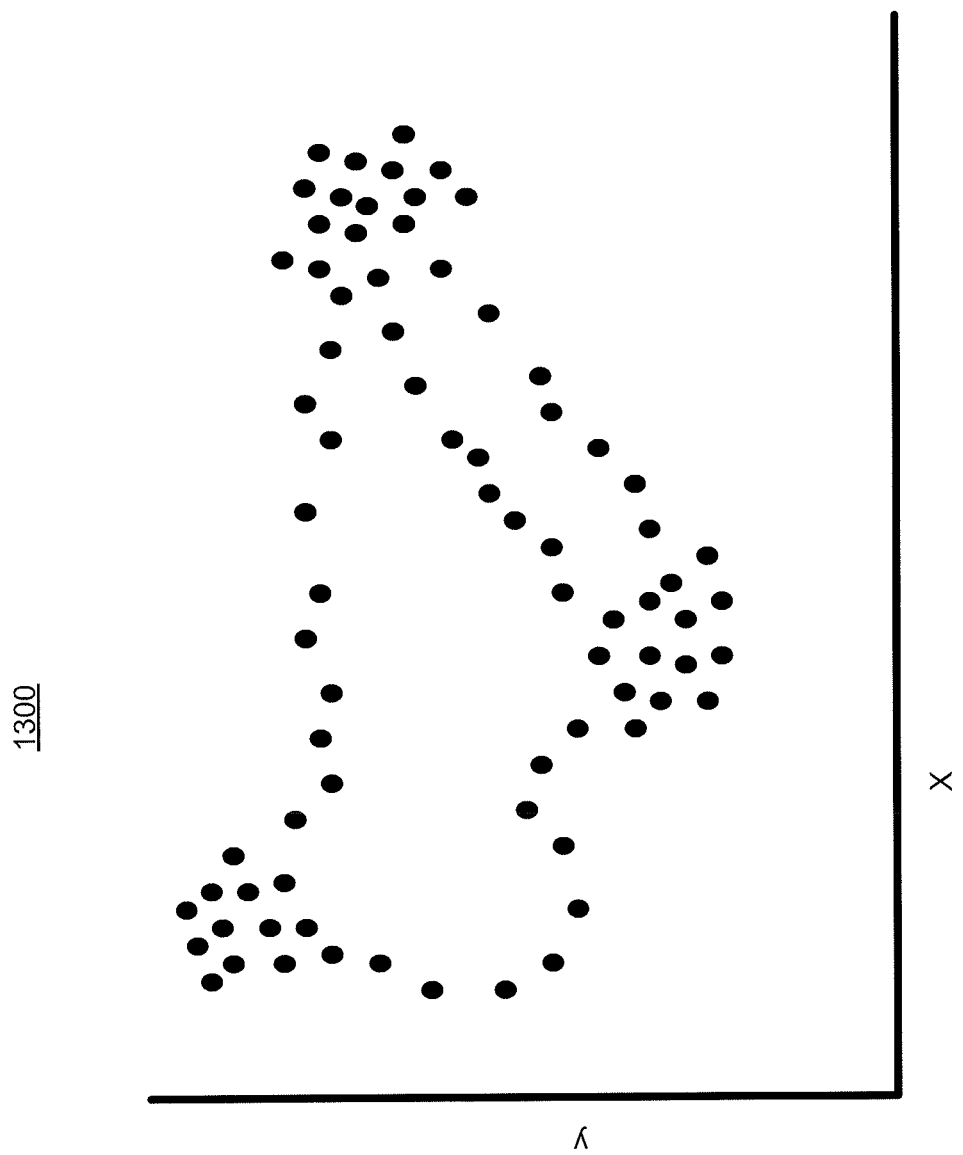
FIG. 13 is a diagram of an exemplary travel graph consistent with disclosed embodiments.

In one embodiment, server 102 may generate a travel graph based on GPS information provided by client device 134. As described above, aspects of the disclosed embodiments include processes that enable client device 134 to send GPS location information to server 102 as a form of consumer data (profile information). Based on the GPS information, server 102 may generate a data structure (reflective for example as a graph) corresponding to GPS location data over a period of time (e.g., day, week, month, etc.). FIG. 13 shows a diagram of an exemplary travel graph 1300 that may be generated consistent with certain aspects of the disclosed embodiments. Each point on travel graph 1300 may represent a GPS location (e.g., x, y, time) for a user (e.g., consumer using client device 134), where x may reflect a latitude (or longitude) GPS location value, and y may reflect a longitude (or latitude) GPS location value. Each GPS location point in travel graph 1300 may include a corresponding time field that reflects a timestamp when the GPS data was collected. Travel graph 1300 may include GPS location data taken over a certain period of time (e.g., hour, day, week, month). Server 102 may generate one or more travel graphs 1300 for different periods of time, for different GPS location regions, for different consumers, and/or for other characteristics.

Figure 14:
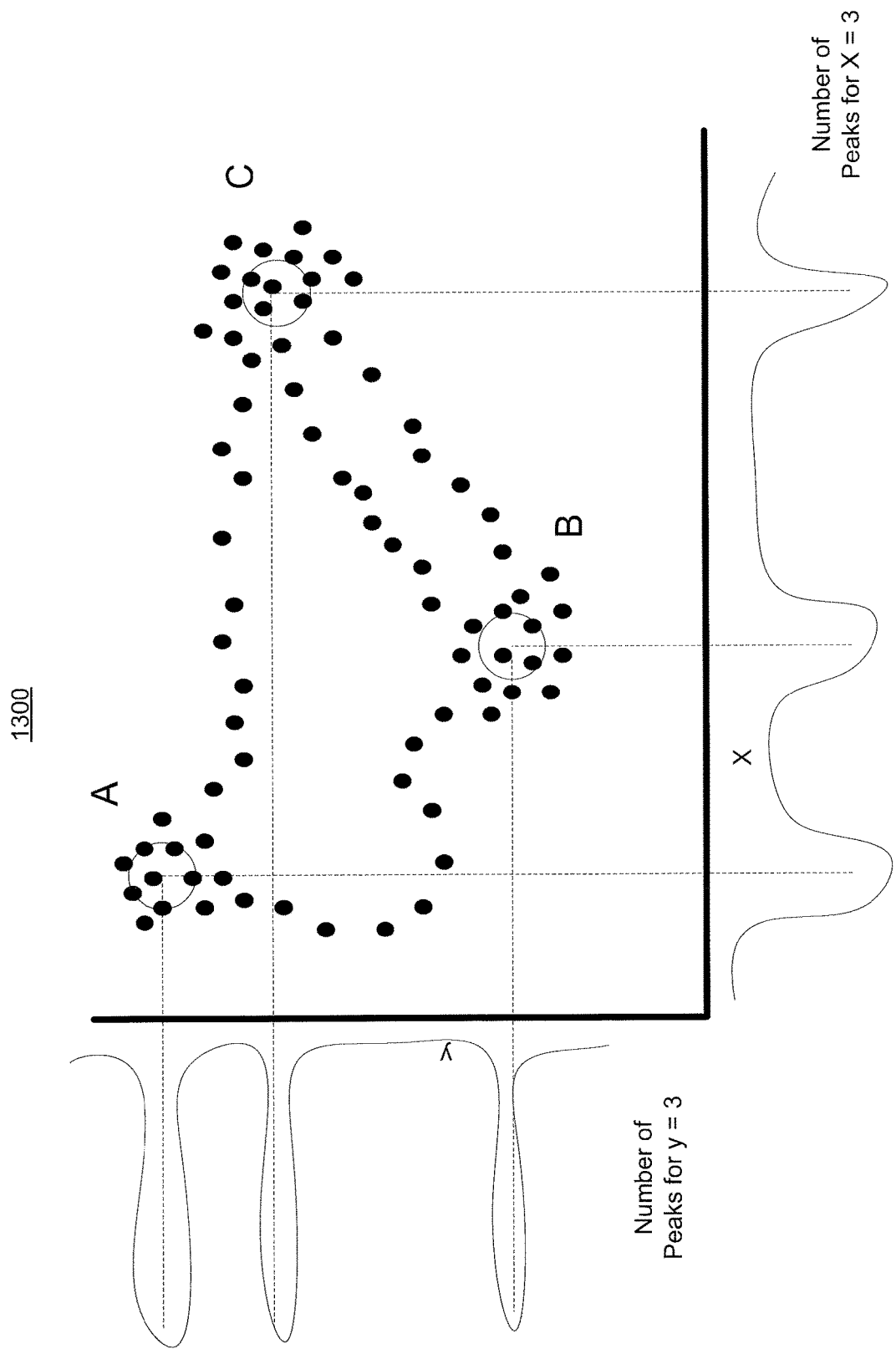
FIG. 14 is a diagram of another exemplary travel graph consistent with disclosed embodiments.

Server 102 may be configured to execute software processes that determine a marginal distribution over the location data included in travel graph 1300. Based on the analysis, server 102 may generate an output that identifies one or more locations of particular locations related to the consumer associated with client device 134. In certain embodiments, server 102 may identify one or more consumer locations based on intersections of peaks in the distribution of location data in travel graph 1300. FIG. 14 shows a diagram of exemplary distribution representations for travel graph 1300 that server 102 may determine consistent with disclosed embodiments. As shown, in exemplary form, server 102 may identify peaks in the marginal distribution of location points in travel graph 1300. In the example of FIG. 14, server 102 may identify 3 peaks of location point distributions in travel graph 1300 for each x and y component of the graph. In this example, travel graph 1300 may include 3 peaks for the x component and 3 peaks for the y component. In certain embodiments, server 102 may determine that a distribution of location points in travel graph 1300 meets or exceeds a determined threshold value.

Based on the location data associated with the intersection of peak values for the x and y component of travel graph 1300, server 102 may identify one or more consumer locations (e.g., A, B, C). Server 102 may determine the number of consumer locations based on the number of peak values. In one aspect, server 102 may execute software that determines the number of locations according to the following calculation:

No. of consumer locations=max (no. of peaks ($x$), no. of peaks ($y$)).

Figure 15:
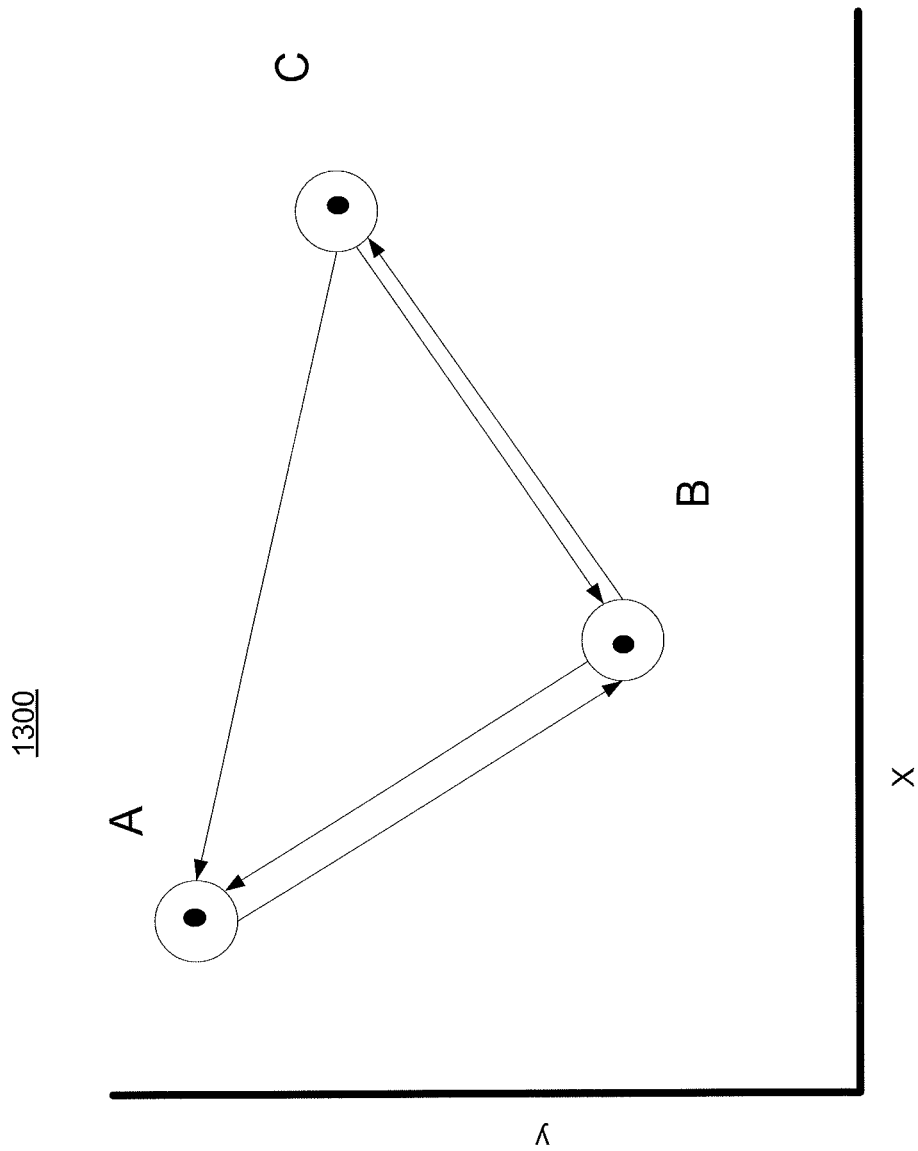
FIG. 15 is a diagram of another exemplary travel graph consistent with disclosed embodiments.

Server 102 may also be configured to use the timestamp components of each GPS point in travel graph 1300 to determine a direction of travel. FIG. 15 shows an exemplary travel graph reflecting determined directions of travel. For example, server 102 may determine an average timestamp values for location data points associated with each location (A, B, C). Server 102 may determine a correlation (e.g., a difference, etc.) between the timestamp data each location at a given point of time. For instance, server 102 may determine that client device 134 was in location C at 7:30 am and in location A at 9:00 am. Server 102 may determine based on timestamp correlation data that client device 134 (or the consumer) has moved from location C to location A. Server 102 may analyze timestamp information for one or more periods of time and create a travel graph that indicates movements of client device 134 (or the consumer). For instance, FIG. 1 shows several representations of determined travel movements of client device 134 between locations A, B, and C. The travel movement information may be stored in a data structure (e.g., a table) for each consumer or client device, and may include one or more tables or graphs for different periods of time.

Based on the location data associated with the intersection of peak values for the x and y component of travel graph 1300, the timestamp information, and/or the travel movement information, server 102 may identify and label one or more consumer locations. For example, as shown in FIG. 14, locations A, B, C may be identified by server 102 as particular consumer locations based on the GPS location data, time stamp information, and consumer profile information. For instance, server 102 may determine that location C is within a certain distance of the consumer's known home location (taken from consumer profile data). Further, server 102 may determine that the data points associated with location C include timestamp data that correlate to estimated time periods when a user is typically at home (e.g., between 6 pm and 6 am). Based on this information (or other data), server 102 may identify location C as the consumer's (and client device 134's) home location. Similarly, server 102 may determine that the location data points and associated timestamp information for location B correlate to a work location (e.g., client device 134 is in location C during the week between 8 am and 5 pm), and location A may correlate to another frequently visited location (a fitness merchant location, retailer, family members location, etc.). Server 102 may generate and store a table or similar data structure reflecting the location identifications and associated information. In certain embodiments, server 102 may determine and identify consumer locations based on a mean and standard deviation data taken from the distribution calculations performed by server 102. Aspects of the disclosed embodiments may use the travel graph information to identify offers (e.g., o) to provide to client device 134. For instance, the travel graphs can be used with the rules and feature event data to set feature matrix values that are used to score offers (e.g., So) consistent with the processes described above.

Figure 16:
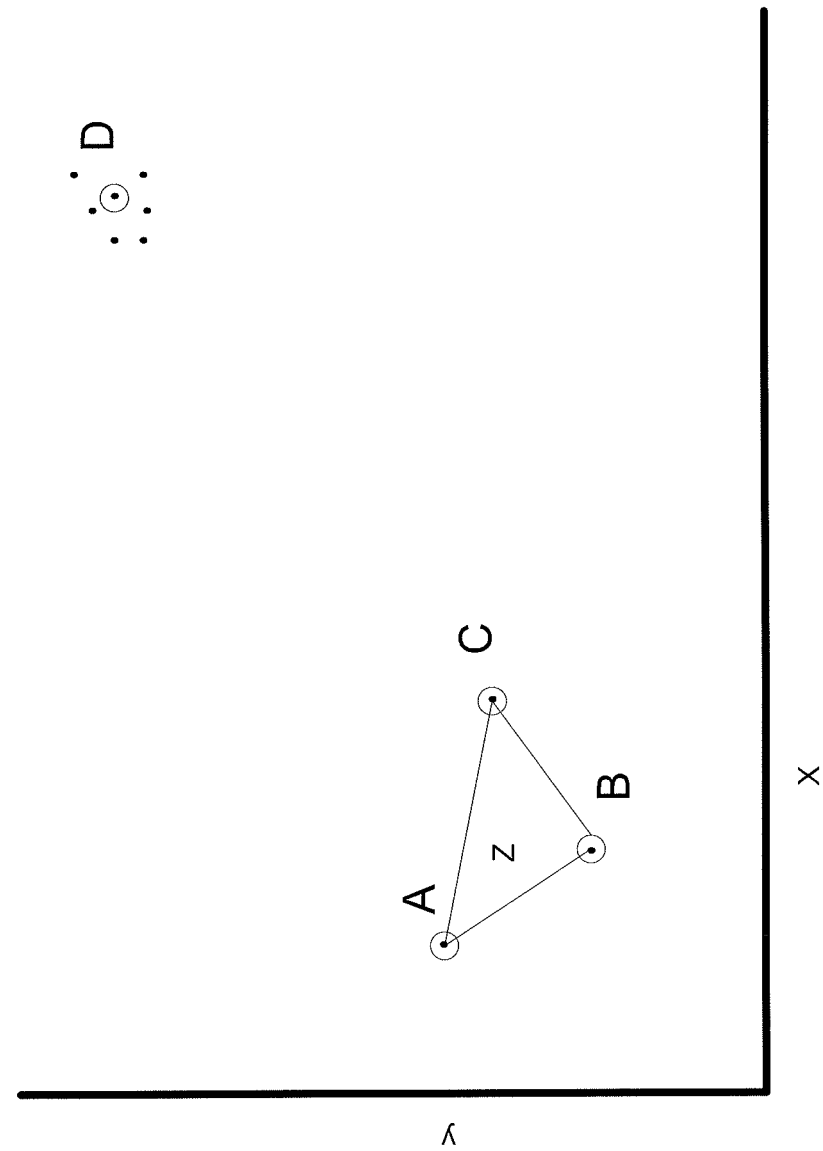
FIG. 16 is a diagram of another exemplary travel graph consistent with disclosed embodiments.

In other embodiments, server 102 may be configured to expand (zoom out) the scale of travel graph 1300 to include locations outside a certain location region. FIG. 16 shows an exemplary travel graph that includes an identified location D that is a certain distance from a region Z (e.g., home region) associated with locations A, B, and C. Thus, for example, server 102 may identify a new grouping of GPS data locations that qualify as a location (e.g., creates a peak at the x and y axis) based on the distribution processes described above. Server 102 may then determine that the new location D is out of town and use that information to identify one or more offers based on the offer identification and presentation processes described above and consistent with the disclosed embodiments.

Figure 17:
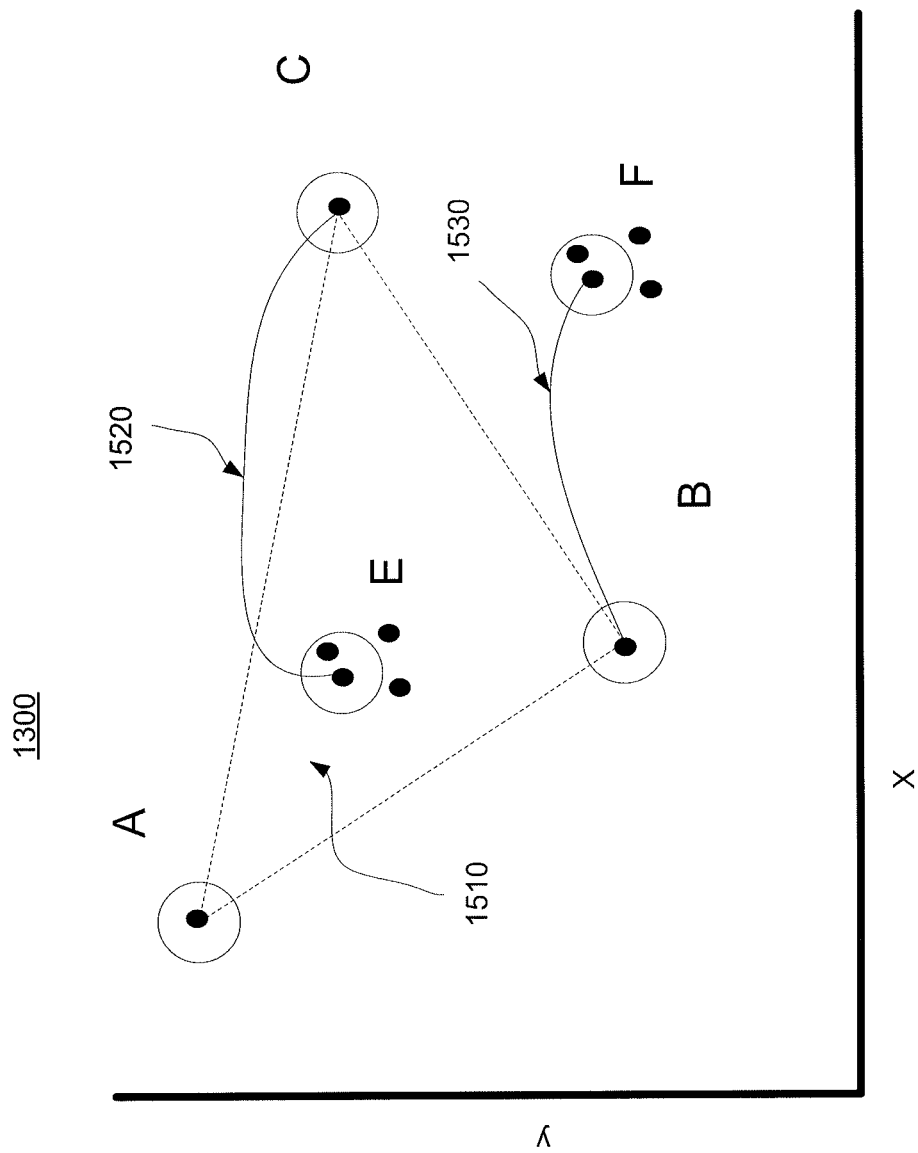
FIG. 17 is a diagram of another exemplary travel graph consistent with disclosed embodiments.

Server 102 may also be configured to zoom in a particular location region (e.g., home region) to identify new consumer locations that are within or near the consumer's home region (e.g., region Z.) FIG. 17 shows an exemplary travel graph including new consumer locations E and F that are near a home region 1510. Thus, for example, server 102 may identify new groupings of GPS data locations (E, F) that qualify as new locations (e.g., identify two new peaks at the x and y axis) based on the distribution processes described above. Server 102 may determine that the new locations E and F that adjust what offers that may be presented to client device 134 based on the rules, feature matrix, and score values determined by the disclosed embodiments. In one aspect, server 102 may be configured to expand home region 1510 to include new location F. In addition, server 102 may identify new travel paths between locations E and F, shown as exemplary paths 1520 and 1530 in FIG. 17.

The travel graph functionalities disclosed above in connection with FIGS. 13-17 may also be performed by client device 134 executing software stored in a memory, such as memory 142. Further, the disclosed embodiments relating to the travel graph processes disclosed above may be configured to generate, store, and provide information that is used to display travel graph representations to a user. For example, server 102 may be configured to execute software processes that receive a request for a travel graph for a particular consumer. Server 102 may also request to identify a time period for the travel graph, consumer locations, or other options. Server 102 may receive response(s) to the request(s) and based on the parameters of the travel graph request identified in the response(s), server 102 may generate a travel graph for display. In one example, server 102 may access the travel graph information generated by server 102 as described above based on the travel graph request. Server 102 may then generate information that is used to provide a representation of a travel graph that is responsive to the request. For instance, server 102 may provide a graphical or tabular representation of travel graph showing travel movements, consumer locations (e.g., A,B,C) with labels, etc.

The disclosed embodiments may also implement similar travel graph functionalities for graphs including more than two axis points, such as three-dimensional graphs (x, y, z), or more.

It is intended that the specification and examples be considered as exemplary only, with a true scope of the disclosure being indicated by the following claims and their equivalents.

What is claimed is:

1. A computing device for providing content to a user comprising: a memory unit storing instructions; and
one or more processors configured to execute the instructions to perform operations comprising:
receiving transactional information about the user;
receiving one or more trigger events from a client device associated with the user;
generating a consumer profile for the user;
storing a list, the list including previous offers previously delivered to the user;
receiving redemption information for each of the previous offers and a current offer during a period of time, wherein the redemption information for each of the previous offers includes a transaction record;
determining whether the one or more trigger events are successful based on the redemption information;
determining a number of potential trigger events and potential offers to deliver to the user, wherein:
the number of potential trigger events is determined based at least on whether the one or more trigger events are successful, and
the potential offers are determined based on at least an analysis of the consumer profile and by using a machine learning algorithm;
generating, using the machine learning algorithm, a recommendation matrix comprising a plurality of weights, the recommendation matrix associating the potential offers with potential trigger events, wherein the recommendation matrix is configured in a table format, the table format including dimensions determined based on the number of potential trigger events and the potential offers; and
delivering the recommendation matrix to the client device.

2. The computing device of claim 1, wherein the consumer profile further indicates at least one of:
a geographic location of the client device;
a set of one or more answers from one or more surveys;
demographic information of the user;
employment status of the user;
credit score of the user;
dependent status of the user;
religious affiliation of the user; or political affiliation of the user.

3. The computing device of claim 2, wherein the at least one or more surveys comprise queries including:
relevancy of the previous offers;
redemption of the previous offers;
delivery method of the previous offers;
timeliness of the previous offers;
amount of the previous offers; or
content of the previous offers.

4. The computing device of claim 1, wherein the redemption information indicates success of the current offer, the success comprising at least one of:
an amount of time between display of the current offer and acceptance of the current offer; or
a time elapsed up to a defined period.

5. The computing device of claim 1, wherein the recommendation matrix includes weight values for combinations of the potential offers and the potential trigger events.

6. The computing device of claim 1, wherein the previous offers, the current offer, and the potential offers include:
advertisement material;
promotional information;
marketing material; or coupons.

7. The computing device of claim 1, wherein the operations further include:
    determining whether resources of the computing device can handle providing the potential offers to the client device; and
    if the resources of the computing device cannot handle providing the potential offers to the client device, instructing the client device to perform one or more of the stored instructions.

8. The computing device of claim 1, wherein the operations further include:
    receiving a travel graph specific to the user, the travel graph generated using location information provided by the client device and indicating travel movements of the client device, over a prior period of time.

9. The computing device of claim 8, wherein the operations further include:
    tracking the location of a transaction made on a user account;
    comparing the location of the transaction with the travel graph of the user; determining whether the transaction is within the travel graph of the user;
    if the transaction is not within the travel graph of the user:
        requesting the location of the client device, comparing the location of the client device to the location of the transaction, and
        if a distance between the location of the client device to the location of the transaction is above a defined threshold, sending an alert to the client device.

10. The computing device of claim 1, wherein the recommendation matrix comprises one or more model coefficients that reflect weight values generated by model analysis.

11. A computer-implemented method for delivering content to a user performed by a computing device, comprising:
    storing transactional information about the user;
    identifying one or more trigger events from a client device associated with the user;
    generating a consumer profile for the user;
    storing a list, the list including previous offers previously delivered to the user;
    receiving redemption information for each of the previous offers and a current offer during a period of time, wherein the redemption information for each of the previous offers includes a transaction record;
    determining whether the one or more trigger events are successful based on the redemption information;
    determining a number of potential trigger events and potential offers to deliver to the user, wherein:
        the number of potential trigger events is determined based at least on whether the one or more trigger events are successful, and
        the potential offers are determined based on at least an analysis of the consumer profile and by using a machine learning algorithm;
    generating, using a machine learning algorithm, a recommendation matrix comprising a plurality of weights, the recommendation matrix associating the potential offers with potential trigger events, wherein the recommendation matrix is configured in a table format, the table format including dimensions determined based on the number of potential trigger events and the potential offers; and
    delivering the recommendation matrix to the client device.

12. The computer-implemented method of claim 11, wherein the consumer profile further indicates at least one of:
    a geographic location of the client device;
    a set of one or more answers from one or more surveys;
    demographic information of the user;
    employment status of the user;
    credit score of the user;
    dependent status of the user;
    religious affiliation of the user; or political affiliation of the user.

13. The computer-implemented method of claim 12, wherein the one or more surveys comprise queries including:
    relevancy of the previous offers;
    redemption of the previous offers;
    delivery method of the previous offers;
    timeliness of the previous offers;
    amount of the previous offers; or content of the previous offers.

14. The computer-implemented method of claim 11, wherein the redemption information indicates success of the current offer, the success comprising at least one of:
    an amount of time between display of the current offer and acceptance of the current offer, or
    a time elapsed up to a defined period.

15. The computer-implemented method of claim 11, wherein the recommendation matrix includes weight value s for combinations of the potential offers and the potential trigger events.

16. The computer-implemented method of claim 11, wherein the method further includes:
    determining whether resources of the computing device can handle providing the potential offers to the client device; and
    if the resources of the computing device cannot handle providing the potential offers to the client device, instructing the client device to perform one or more of stored instructions.

17. The computer-implemented method of claim 11, wherein the method further includes:
    receiving a travel graph specific to the user, the travel graph generated using location information provided by the client device and indicating travel movements of the client device, over a prior period of time.

18. The computer-implemented method of claim 11, wherein the method further includes:
    tracking a location of a transaction made on a user account;
    comparing the location of the transaction with a travel graph of the user; determining whether the transaction is within the travel graph of the user;
    if the transaction is not within the travel graph of the user:
        requesting the location of the client device, comparing the location of the client device to the location of the transaction, and
        if a distance between the location of the client device to the location of the transaction is above a defined threshold, sending an alert to the client device.

19. The computer-implemented method of claim 11, wherein the recommendation matrix comprises one or more model coefficients that reflect weight values generated by model analysis.

20. A system for providing content to a user, comprising:
a memory storing instructions; and
a processor configured to execute the instructions to perform operations including:
  receiving and storing transactional information about the user;
  receiving one or more trigger events from a client device associated with the user;
  generating a consumer profile for the user;
  storing a list, the list including previous offers previously delivered to the user;
  storing redemption information for each of the previous offers and current offers during a period of time, wherein the redemption information for each of the previous offers includes a transaction record;
  determining whether the one or more trigger events are successful based on the redemption information;
  determining a number of potential trigger events and potential offers to deliver to the user, wherein:
    the number of potential trigger events is determined based at least on whether the one or more trigger events are successful, and
    the potential offers are determined based on at least an analysis of the consumer profile and by using a machine learning algorithm;
  generating, using the machine learning algorithm, a recommendation matrix comprising a plurality of weights, the recommendation matrix associating the potential offers with potential trigger events, wherein the recommendation matrix is configured in a table format, the table format including dimensions determined based on the number of potential trigger events and the potential offers; and
  delivering the recommendation matrix to the client device.

* * * * *